(12) United States Patent
Movsesian et al.

(10) Patent No.: US 7,083,147 B2
(45) Date of Patent: Aug. 1, 2006

(54) MODULARIZED INSULATION, SYSTEMS, APPARATUS, AND METHODS

(75) Inventors: Sami Movsesian, Glendale, CA (US); Jayant Dahyabhai Patel, Lake Forest, CA (US); Ted Workman, Riverside, CA (US); Marc A. Deramo, Orange, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/800,308

(22) Filed: Mar. 11, 2004

(65) Prior Publication Data

US 2005/0211839 A1     Sep. 29, 2005

(51) Int. Cl.
*B64C 1/10*     (2006.01)

(52) U.S. Cl. .......................... 244/121; 428/71; 428/72; 428/74

(58) Field of Classification Search ................ 244/119, 244/123, 124, 126, 134 F, 110 H, 110 A, 244/110 R, 71, 54, 55, 118.1, 118.2, 118, 244/118.6, 121; 428/192, 188, 200, 75, 322.7, 428/343–356, 74, 76, 195.1, 160, 178, 198; 431/451; 383/110; 150/901; 277/628, 630, 277/637, 650, 652

See application file for complete search history.

(56) References Cited

U.S. PATENT DOCUMENTS

| | | | | |
|---|---|---|---|---|
| 1,866,534 A | * | 7/1932 | Janin ............................ 244/120 |
| 1,972,005 A | * | 8/1934 | Berback ....................... 244/119 |
| 2,095,626 A | * | 10/1937 | Bassett et al. ................. 52/275 |
| 2,160,066 A | * | 5/1939 | Frische ....................... 52/407.1 |
| 2,409,951 A | * | 10/1946 | Nootens .................... 52/404.5 |
| 2,893,068 A | * | 7/1959 | Johnson et al. ............... 52/474 |
| 3,003,902 A | * | 10/1961 | McDuff ........................ 428/75 |
| 3,058,704 A | * | 10/1962 | Bergstedt ..................... 244/119 |
| 3,160,549 A | * | 12/1964 | Caldwell et al. .......... 428/317.3 |
| 3,193,049 A | * | 7/1965 | Wollek ........................ 181/208 |
| 3,386,527 A | * | 6/1968 | Daubert et al. ............. 181/208 |
| 3,435,581 A | * | 4/1969 | Ahlqvist .................... 52/405.1 |
| 3,490,983 A | * | 1/1970 | Lee .............................. 428/113 |
| 3,567,162 A | * | 3/1971 | Lea ............................ 244/121 |
| 3,740,905 A | | 6/1973 | Adams |
| 3,799,056 A | * | 3/1974 | Colignon ................ 244/117 A |
| 3,830,666 A | * | 8/1974 | Schneider ..................... 156/86 |
| 3,867,244 A | * | 2/1975 | Adams ........................ 428/182 |
| 3,906,128 A | * | 9/1975 | Burling et al. ................ 428/86 |
| 4,041,872 A | * | 8/1977 | McCown et al. ........ 250/515.1 |
| 4,130,972 A | * | 12/1978 | Varlonga ...................... 52/241 |

(Continued)

FOREIGN PATENT DOCUMENTS

WO     WO 02/052086     * 12/2001

*Primary Examiner*—Teri Pham Luu
*Assistant Examiner*—Stephen A. Holzen
(74) *Attorney, Agent, or Firm*—Fredrikson & Byron, PA

(57) ABSTRACT

Modularized insulation blanket for thermal and/or acoustical insulation. The modularized insulation blanket has a cover formed of a distal layer and proximal layer in sealed mated relationship. The distal and proximal layers are sealed along longitudinal and latitudinal heat-sealed seams that define a plurality of modules. The heat-sealed seam may be creased so as to be foldable and/or perforated to provide a tear line. Within the modules are batting blocks. The blankets may be attached to surface structures such as the interior skin surface of an aircraft fuselage, pipes or other structures with retention systems. The blankets may be formed in an apparatus including a platen, heat seal rollers or heating sealing mechanisms, and edge sealers.

20 Claims, 11 Drawing Sheets

U.S. PATENT DOCUMENTS

| | | | | |
|---|---|---|---|---|
| 4,198,454 A | * | 4/1980 | Norton | 428/117 |
| 4,228,215 A | * | 10/1980 | Hein et al. | 428/216 |
| 4,230,293 A | * | 10/1980 | Hamm et al. | 244/119 |
| 4,235,398 A | * | 11/1980 | Johnson | 244/119 |
| 4,275,473 A | * | 6/1981 | Poirier | 441/128 |
| 4,291,851 A | * | 9/1981 | Johnson | 244/119 |
| 4,338,368 A | * | 7/1982 | Lovelace et al. | 428/212 |
| 4,344,591 A | * | 8/1982 | Jackson | 244/159.1 |
| 4,358,480 A | * | 11/1982 | Ecord et al. | 427/140 |
| 4,390,575 A | * | 6/1983 | Kopp | 210/500.23 |
| 4,439,968 A | * | 4/1984 | Dunn | 52/404.2 |
| 4,442,647 A | * | 4/1984 | Olsen | 52/393 |
| 4,456,208 A | * | 6/1984 | MacConochie et al. | 244/159.1 |
| 4,489,906 A | * | 12/1984 | Fellas | 244/171.7 |
| 4,535,017 A | * | 8/1985 | Kuckein et al. | 428/77 |
| 4,557,444 A | * | 12/1985 | Jackson et al. | 244/159.1 |
| 4,578,909 A | * | 4/1986 | Henley et al. | 52/91.3 |
| 4,594,278 A | * | 6/1986 | Nixon | 428/68 |
| 4,600,620 A | * | 7/1986 | Lloyd et al. | 428/195.1 |
| 4,635,882 A | * | 1/1987 | SenGupta et al. | 244/119 |
| 4,646,499 A | * | 3/1987 | Wilson | 52/408 |
| 4,649,795 A | * | 3/1987 | Olander | 89/1.14 |
| 4,656,681 A | * | 4/1987 | Alexander et al. | 5/668 |
| 4,713,275 A | * | 12/1987 | Riccitiello et al. | 428/76 |
| 4,734,323 A | * | 3/1988 | Sato et al. | 428/317.3 |
| 4,756,937 A | * | 7/1988 | Mentzer | 428/35.2 |
| 4,931,333 A | * | 6/1990 | Henry | 428/76 |
| 4,989,688 A | * | 2/1991 | Nelson | 181/287 |
| 5,034,085 A | * | 7/1991 | Brauchl | 156/293 |
| 5,038,693 A | * | 8/1991 | Kourtides et al. | 112/440 |
| 5,044,705 A | * | 9/1991 | Nelson | 312/228 |
| 5,121,515 A | * | 6/1992 | Hudson | 5/636 |
| 5,165,627 A | * | 11/1992 | Amano et al. | 244/119 |
| 5,169,700 A | * | 12/1992 | Meier et al. | 428/74 |
| 5,190,248 A | * | 3/1993 | Lee | 244/121 |
| 5,194,315 A | * | 3/1993 | Itoh | 428/178 |
| 5,234,660 A | * | 8/1993 | Simko, Jr. | 266/286 |
| 5,251,849 A | * | 10/1993 | Torres | 244/117 R |
| 5,360,653 A | * | 11/1994 | Ackley | 428/71 |
| 5,362,539 A | * | 11/1994 | Hall et al. | 428/68 |
| 5,398,889 A | * | 3/1995 | White et al. | 244/119 |
| 5,431,990 A | * | 7/1995 | Haynes et al. | 428/218 |
| 5,472,760 A | * | 12/1995 | Norvell | 428/71 |
| 5,489,462 A | * | 2/1996 | Sieber | 428/174 |
| 5,532,039 A | * | 7/1996 | Payne et al. | 428/116 |
| 5,560,569 A | * | 10/1996 | Schmidt | 244/117 R |
| 5,577,688 A | * | 11/1996 | Sloan | 244/117 R |
| 5,611,504 A | * | 3/1997 | Haynes et al. | 244/119 |
| 5,678,384 A | * | 10/1997 | Maze | 52/783.17 |
| 5,684,278 A | * | 11/1997 | Yasukawa et al. | 181/286 |
| 5,700,118 A | * | 12/1997 | Bennett et al. | 410/113 |
| 5,759,659 A | * | 6/1998 | Sanocki et al. | 428/74 |
| 5,779,193 A | * | 7/1998 | Sloan | 244/117 R |
| 5,788,184 A | * | 8/1998 | Eddy | 244/121 |
| 5,811,167 A | * | 9/1998 | Norvell | 428/76 |
| 5,895,013 A | * | 4/1999 | Towfiq | 244/119 |
| 5,928,752 A | * | 7/1999 | Newquist | 428/74 |
| 5,958,583 A | * | 9/1999 | Rorabaugh et al. | 428/365 |
| 5,985,362 A | * | 11/1999 | Specht et al. | 427/236 |
| 6,007,026 A | * | 12/1999 | Shorey | 244/158 A |
| 6,141,930 A | * | 11/2000 | Allwein et al. | 52/404.1 |
| 6,179,086 B1 | * | 1/2001 | Bansemir et al. | 181/292 |
| 6,277,463 B1 | * | 8/2001 | Hamilton et al. | 428/106 |
| 6,299,106 B1 | * | 10/2001 | Shorey | 244/158 A |
| 6,312,561 B1 | * | 11/2001 | Forsten et al. | 162/145 |
| 6,318,673 B1 | * | 11/2001 | Wolters | 244/158 R |
| 6,358,591 B1 | * | 3/2002 | Smith | 428/74 |
| 6,538,591 B1 | * | 3/2002 | Smith | 428/74 |
| 6,479,560 B1 | * | 11/2002 | Freitag et al. | 521/130 |
| 6,502,788 B1 | * | 1/2003 | Noda et al. | 244/123.3 |
| 6,505,794 B1 | * | 1/2003 | Myers et al. | 244/159.1 |
| 6,579,396 B1 | * | 6/2003 | Erb, Jr. | 156/166 |
| 6,615,906 B1 | * | 9/2003 | Fieback et al. | 165/10 |
| 6,645,598 B1 | * | 11/2003 | Alderman | 428/69 |
| 6,677,026 B1 | * | 1/2004 | Yates | 428/137 |
| 6,811,852 B1 | * | 11/2004 | Alderman | 428/69 |
| 6,930,352 B1 | * | 8/2005 | Saito et al. | 257/330 |
| 2002/0040556 A1 | * | 4/2002 | Weinstein et al. | 52/98 |
| 2002/0096601 A1 | * | 7/2002 | Myers et al. | 244/121 |
| 2002/0187699 A1 | * | 12/2002 | Takeda et al. | 442/301 |
| 2003/0008093 A1 | * | 1/2003 | Ray et al. | 428/36.91 |
| 2003/0061777 A1 | * | 4/2003 | Alderman | 52/407.3 |
| 2003/0129330 A1 | * | 7/2003 | Alderman | 428/34.1 |
| 2003/0145773 A1 | * | 8/2003 | Barney et al. | 112/420 |
| 2003/0213399 A1 | * | 11/2003 | Norton et al. | 105/355 |
| 2004/0163345 A1 | * | 8/2004 | Alderman | 52/404.1 |
| 2004/0247819 A1 | * | 12/2004 | Khieu et al. | 428/74 |
| 2005/0034382 A1 | * | 2/2005 | Gosselin | 52/130 |
| 2005/0058790 A1 | * | 3/2005 | Simon et al. | 428/35.7 |
| 2005/0118366 A1 | * | 6/2005 | Piemonte et al. | 428/34.1 |

* cited by examiner

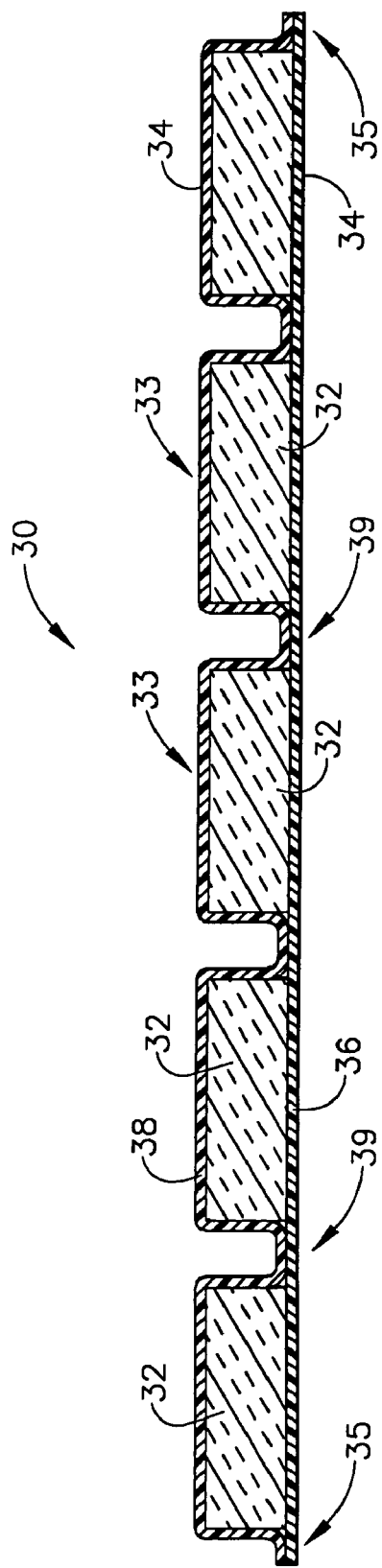
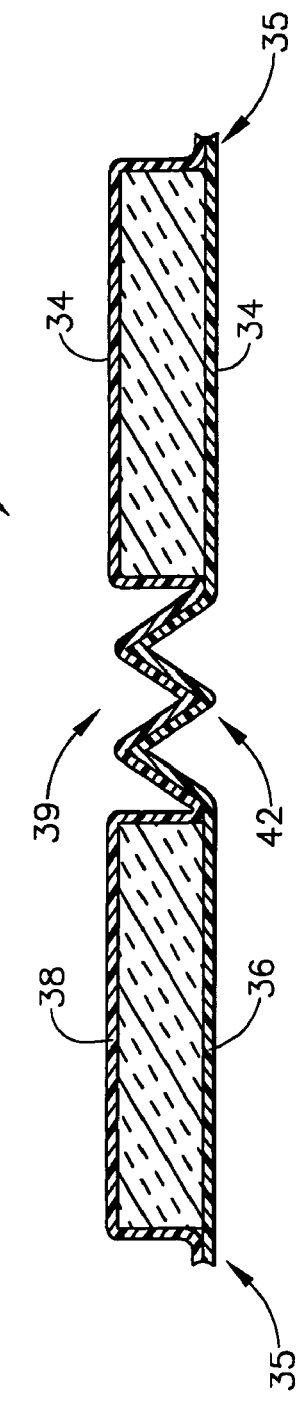

MODULARIZED INSULATION, SYSTEMS, APPARATUS, AND METHODS

FIELD OF THE INVENTION

The present invention relates to modular thermal and/or acoustical insulation and retention systems for universal structural applications, methods of making the systems and equipment utilized in the methods. Further, the present invention relates to aircraft fuselages and other structures incorporating the insulation and retention systems.

BACKGROUND OF THE INVENTION

Insulation and insulation systems may be utilized to provide thermal and/or acoustical insulation in a variety of applications for homes, buildings and other structures, piping and duct work, aircraft, watercraft and the like. In aircraft, insulation is typically installed to aircraft interior surface structures, subcomponents and subsystems in order to protect occupants, cargo, and equipment, as well as the aircraft structural components from thermal and acoustic extremes and adverse environmental conditions and noise associated with engine operation, mechanical vibration and high velocity air flow.

In a medium sized aircraft, there may be as many as 500 insulation applications; and even more in the largest of aircraft. Amongst the primary applications areas are passenger and cargo compartments, and may further be applied in other compartments and components such as to environmental control systems, water and waste systems or any other area where thermal and/or acoustical protection is desired or required.

Commercial and other aircraft may experience extremely high moisture condensation and associated water leakage through overhead panels due to a phenomena commonly referred to in the commercial airplane industry as "Rain-in-the-Plane." This problem originates moisture contributions from various sources, including the environmental control systems, conditioned air duct distribution systems, internal-external temperature differentials, and passenger breathing. It is the most severe in aircraft operated in high humidity conditions or in tropical climates. When released, the condensate often affects electrical systems housed behind and on ceiling panels, can cause corrosion and shorten aircraft useful life. Damaged electrical systems can cause equipment failure and dangerous operational malfunctions, requiring equipment repair and replacement or initiation of in flight emergency landing procedures, such as fuel dumping and premature landings at the nearest available airport. The negative affects of condensed moisture in aircraft and related emergency measures can result in significant economic losses due to costs associated with fuel dumping, lost flight time due to grounding of out-of-service aircraft, passenger discomfort, inconvenience and lack of confidence, and required systems analyses and repairs. These losses are currently being incurred by the commercial airplane industry with the use of conventional insulation systems.

Insulation systems or assemblies utilized in aircraft are commonly referred to as "blankets." An example of a prior art insulation blanket 10 is illustrated in FIG. 1. Prior art insulation blanket 10 is typically of a generally rectangular or square shape and is formed of an insulating batting 12 disposed between a cover 14, usually two plastic or polymeric sheets 16. The perimeter edges 18 of sheets 16 of prior art blanket 10 are sealed or joined together with tape or heat sealed. Prior art blanket 10 may also be provided with breathers such as the prior art breather 20 shown in FIG. 2. FIG. 2 is a fragmentary, plan view of prior art blanket 10. Breather 20 is a window cut into the blanket cover 14 through one of the sheets 16 over which an open weave or screen material 22 is applied and affixed with strips of tape 24. Breathers allow air, gases and moisture to pass into and out of the blanket. Without breathers, some insulation blankets may balloon and possibly rupture. Batting 12 is typically a non-woven material formed of loose, compressible fibers, such as materials generically referred to as fiberglass.

Batting 12 is prone to shifting within prior art blanket 10 after installation over a period of use due to gravitational, vibrational and impact forces and can cause bulking or gathering at the lowest point of prior art blanket 10 when attached to a vertical or arcuate surface. With respect to an arcuate surface, prior art blanket 10 and the surface are typically not in constant interface, meaning that prior art blanket 10 does not completely conform to the shape of the surface when installed. This can also be a problem on vertical and horizontal surfaces to which insulating blankets are improperly installed without attention to assuring that the blanket and surface are in constant interface. Such improper installation may reduce the effectiveness of the insulation. Further, it may result in "pockets" or "pocketing" where moisture accumulated within the blanket or its batting may pool or in pooling of condensate between the blanket and the horizontal or arcuate surface. Insulation blankets applied with a constant interface provide desirable insulation performance; however, most prior art insulation blankets are typically installed without a constant interface. A "constant interface" is understood to mean that a blanket generally conforms to the surface to which it is installed without pocketing and with minimal to no space between the surface of the blanket and the surface of the structure to which it is applied or installed. Bulking, pocketing and pooling negatively impact the thermal and/or acoustical performance of the blanket and may promote Rain-in-the-Plane.

There are a significant number of different aircraft designs and models and an equally significant, if not greater, variety of potential insulation applications, individual components and locations, in aircraft. Insulation blankets are developed, sized, and formed in a number of standard sizes for individual aircraft components and locations. This requires preparation of preliminary detailed designs from which cover sheet and batting templates are developed for the various components and locations for a variety of different aircraft. For purposes of illustration and context, in a medium sized aircraft, there are approximately 500 different blanket sizes requiring 1500 templates. Templates are then used as patterns to fabricate blankets sized and shaped for the large number of individual component and locations. This results in a large inventory of different sized blankets for different aircraft models and designs that must be stored or stockpiled on hand for installation in aircraft under assembly.

Even with such a stockpile of standardized blankets, there remain a number of applications for which these prior art blankets are not a good fit. Such applications require, extensive reworking of the blankets. For the reworking, aircraft assembly workers have to cut and size the blankets, and to seal the cut perimeter edge or edges in order to contain the batting within the blanket. Sealing can involve folding of the edges along with sewing, taping, heat sealing or combinations of these steps. This is not only a labor intensive effort, but an inefficient fix, both in terms of blanket integrity and performance, as well as in time and expense. Further, it exposes the workers to contact with the batting fibers. Excessive handling of and contact with batting material can result in skin contact with the fibers and cause shedding of fibers which can be come airborne. Exposure to batting fibers is known to have the potential for deleterious human health effects, such as skin irritations (e.g., swelling, break-out, and rush) and negative respirator and breathing impacts.

Installation methods for prior art insulation blankets in aircraft are labor intensive, requiring expensive hardware and long set-up times to position blankets, identify tie-points, mark attachment points, coordinate mating points with stand-offs, apply the stand-offs (typically with adhesives), cure adhesives, and provide breathers or breathing systems. Insulation blanket retentions systems some times require punching, puncturing, piercing and/or darting through the body of the blanket in order to provide proper mating or attachment points with stand-offs and fasteners. Prior art blankets can be heavy and cumbersome, making for difficult handling. Despite best efforts, prior art installation methods are susceptible to error and to inconsistencies which can lead to the pocketing problems previously mentioned. Customizing to unique customer aircraft components, inconsistent draping of insulation blankets around curvatures, inadequate tension, failure to provide constant interfaces and the like also contribute to installation errors and pocketing.

In FIG. 3, a section of duct 26 (shown in partially, cross-sectional view) insulated with prior art blanket 10 is shown. Typically, this prior art blanket is assembled at the time of installation typically by applying batting 12, securing batting 12 with tape or fiberglass cord 27 (as shown) in order to hold or stabilize batting 12 in place and avoid to avoid shifting, and covering the batting with sheet 16. Optionally, prior to applying batting 12, a sheet 16 may be first secured to duct 26 as is shown in FIG. 3; of course, the addition of sheet 16 prior to applying batting 12, represents an additional installation step with associated materials and labor costs. Adhesives applied to the exterior surface of a duct 26 prior to covering with the surface with prior art blanket 10 may require surface preparation and curing time. Typically, as can be seen in FIG. 3, when insulating ducts and pipes, large spaces have to be left uncovered and unprotected by the blanket 10 in order to provide a surface of sufficient size to secure the perimeter edge 18 of blanket 10 with tape 24, bead clamps and the like. In FIG. 3, such a bear space can be seen to the left with the perimeter edge 18 of cover 14, where no batting is present, secured over such the bear space with tape 28. This essentially results in a space with minimal to no effective insulation. An even greater space is needed between adjacent prior art blanket sections on a length of pipe or duct, resulting in reduced or less than optimal insulation.

The foregoing is not an exhaustive listing of the disadvantages of prior art insulation blankets and installation methods but due represent some of the more significant shortcomings and deficiencies of the prior art. It would be desirable to provide insulation blankets and retentions systems that overcome some, all or various combinations of the shortcomings and deficiencies of the prior art.

Applicants have developed modularized installation and retentions systems the various embodiments of which overcome some, all or various combinations of the above-noted shortcomings and deficiencies of the prior art.

SUMMARY OF THE INVENTION

The present invention provides a modular insulation blanket useful for various insulation applications, including aircraft insulation applications. In an embodiment of the invention, the modular insulation blanket comprises a plurality of batting blocks and a cover having sealed perimeter edges and a plurality of modules. The cover is comprised of a distal layer and a proximal layer. The two layers are mated in sealed relationship along a heat-sealed seam with the batting blocks disposed between the layer within the modules which are separated by the heat-sealed seams.

In another embodiment of the invention, the modular insulating blanket is useful for thermal and/or acoustical insulation of a surface of a structure and is comprised of a plurality of batting blocks and a cover having sealed perimeter edges and a plurality of modules. The batting blocks are formed of woven insulating materials, non-woven insulating materials or combinations thereof. The a cover is comprised of a distal layer and a proximal layer. The layers each having perimeter edges and each is formed of a flexible, thermoplastic film sheet. The layers are mated in heat sealed relationship along a plurality of heat-sealed seams and at the perimeter edges. The batting blocks are disposed between the layers within the cover modules and are separated by the plurality of heat-sealed seams.

Provided in yet another embodiment of the invention is an aircraft fuselage insulated with a modular insulation blanket of the invention is provided. The insulated aircraft fuselage is comprised of an aircraft fuselage and a plurality of modular insulating blankets. An aircraft fuselage has an interior skin surface and an exterior skin surface. The interior skin surface bears a series of struts in spaced relationship. The each of the plurality of modular insulating blankets comprise of a plurality of batting blocks and a cover having sealed perimeter edges and a plurality of modules. The cover is comprised of a distal layer and a proximal layer. The layers are mated in sealed relationship with the batting blocks disposed between the layers within the modules which are separated by heat-sealed seams. The insulating blankets are affixed to the interior skin surface of the fuselage and are adhered to the interior skin surface between the struts.

In the aforementioned and other embodiments of the invention, the distal and proximal layers of the insulation blanket of the invention each have an interior cover surface and an exterior cover surface and each of the plurality of batting blocks are attached to at least one interior cover surface of the module in which said batting block is disposed. This helps to prevent or minimize shifting of the batting blocks within the modules.

Further, in the aforementioned and other embodiments, at least one of the heat-sealed seams may be perforated to provide a tear-line in a foldable heat-sealed seam or in a perforated foldable heat-sealed seam, which may be referred to as a tearable heat-sealed seam. The tear-line allow for sizing of the blanket by cutting or tearing along the tear-line without exposing the batting or possibility of batting fibers becoming airborne. This method of sizing is both less expensive and labor intensive than that of the prior art. Foldable heat-sealed seams and the compressible folds thereof have some limited spring like attributes and can provide lateral support and stability to blankets installed between struts of a structure. Further, compressed folds may act as a stop against compression of the batting which can result in diminished or loss of insulation properties. Prior art blankets do not have such folds or foldable heat-sealed seams and cannot provide these advantages and features provided in certain embodiments of the invention.

In the aforementioned and other embodiments of the invention, the modular insulation blanket may be provided with breathers or a breathing system. One illustrative example of a breathing system is a plurality of perforations formed in the distal and/or proximal layers.

In the aforementioned and yet other embodiments of the invention, the modular insulation blanket may be provided with retention systems or a plurality of attachment means affixed to an exterior surface a cover layer, typically the proximal layer but the distal layer may also be provided with such retention system or plurality of attachment means. Thus, embodiments of the invention may further comprise a retention system or a plurality of attachment means selected from the group consisting of a mated mechanical attachment system, a peel-and-stick tape system, a hook-loop retention system, tape, combined hook and loop and peel and stick tape retention systems, self-adhering retention systems, adhesives, a plurality of mechanical fasteners, and combinations thereof. Providing such retention systems as part of some embodiments of the insulation blanket of the invention allows for ease of installation without the significant surface preparation and attendant labor and costs. Further, they allow for blanket installation with a constant interface, minimizing or eliminating the pocketing and pooling and the associated negative effects seen in prior art insulation blankets.

The present invention further provides a method of making a modularized insulating blanket. In an embodiment, the methods of the invention comprises the following steps which are not necessarily presented in required order of sequence. A distal cover layer is provided. The distal cover layer has a perimeter edge, an interior surface, an interior surface and a central region. A plurality of batting blocks are positioned on the central region of the interior surface of the distal cover layer in spaced relationship so as to provide a mating space between the batting blocks. A proximal cover layer is provided. The proximal cover layer has a perimeter edge, an exterior surface, an interior surface and a central region. The proximal cover layer is sized to provide sufficient material to form modules surrounding and encapsulating the batting blocks on all sides in conjunction with distal layer. The proximal cover layer is placed over the distal cover layer and the plurality of batting blocks positioned thereon, with the portions of the layers at their perimeter edges and within the mating spaces between batting blocks overlapping and aligned in mating relationship. Heat and pressure are applied to the cover layers along the perimeter edges and along the mating spaces between batting blocks to seal the perimeter edges and to form a plurality of heat sealed seams along the mating spaces, the heat sealed seams defining a plurality of modules with batting blocks disposed between the cover layers.

The aforementioned and other embodiments of methods of the invention may further comprise the step of perforating at least one of the heat sealed seams to provide a tearable heat sealed seam and/or perforating the distal layer and/or the proximal cover layer to provide a breathing system in each of the plurality of modules. Tearable heat seal seams can be cut or torn for sizing of blankets according to the invention without exposing the batting or risk of fibers becoming airborne which frequently occurs with sizing of prior art blankets during installation.

In the aforementioned and other embodiments of methods of the invention, the mating space between at least one pair of adjacent batting blocks is sized to accommodate a foldable heat-sealed seam and the method may further comprise the step of providing an odd number of creases to the heat-sealed seam formed between at least one pair of adjacent batting blocks to form a foldable heat-sealed seam. The odd number of creases comprises at least three creases.

The present invention further provides an apparatus for forming insulation blankets. In an embodiment of the apparatus, the apparatus comprising a platen, at least one edge sealer, and a plurality of heat seal rollers. The platen is sized and configured to receive a blanket assembly comprised of a distal layer, a proximal layer and a plurality of batting blocks disposed there between in spaced relationship with a plurality of spaces between the batting blocks which define mating spaces in which the distal and proximal layers overlap. The rollers are spaced apart a predetermined distance in alignment with the mating spaces.

In the aforementioned and other embodiments of an apparatus of the invention, the heat seal rollers and portions of the platen are in alignment with the mating spaces and are configured to cooperate together to apply heat and pressure to portions of distal and proximal layers overlapping within the mating spaces to form heat-sealed seams. The heat seal rollers and portions of the platen in alignment therewith may be further configured with a plurality of perforation elements and a plurality of recessed dentitions that correspond to and receive the perforations elements. The heat seal rollers and the portions of the platen in alignment therewith may be further configured to form heat sealed seams selected from the group consisting of non-foldable heat sealed seams, foldable heat-sealed seam, perforated heat-sealed seams, perforated and foldable heat-seal seams.

In another embodiment of an apparatus of the invention for forming insulation blankets, the apparatus comprises a platen, at least one edge sealer, and a heat seal mechanism. The platen is sized and configured to receive a blanket assembly comprised of a distal layer, a proximal layer and a plurality of batting blocks disposed there between in spaced relationship with a plurality of spaces between batting blocks defining mating spaces. In a further aspect, the apparatus of this and other embodiments of the invention, the heat seal mechanism may be comprised of a lattice of interconnected heat sealing elements which intersect and are oriented longitudinally and latitudinally. In another aspect of the embodiments of an apparatus of the invention, the mating spaces may have a width and the heat sealing elements may also have a width corresponding to the width of the mating spaces. Further, the heating elements and portions of the platen in alignment with the mating spaces are configured to cooperate together to apply heat and pressure to portions of distal and proximal layers overlapping within the mating spaces to form heat-sealed seams.

In a further embodiments of an apparatus of the invention, the heating elements and portions of the platen in alignment therewith are configured with plurality of perforation elements and a plurality of recessed dentitions that correspond to and receive the perforations elements.

In yet another embodiment of an apparatus of the invention, the heating elements are configured to form heat sealed seams selected from the group consisting of non-foldable heat sealed seams, foldable heat-sealed seam, perforated heat-sealed seams, perforated and foldable heat-seal seams.

In the various embodiments of an apparatus of the invention, platen may be a unitary element or the portions of platens in alignment with heating elements or heat seal rollers may be removable platen sections. Removable platen sections may be configured to provide different types of heat-sealed seams, providing flexibility without need for multiple apparatus separately configured to manufacture blankets according to the invention with different types of seams.

The various embodiments of an apparatus of the invention may further comprise an actuating mechanism. Actuating mechanisms may be comprised of components selected from the group consisting of drives, motors, temperature regulators, pressure regulators, time regulators, electronic controls for automated or semi-automated operation, connections to electric power sources, and combinations thereof; and temperature probes and/or pressure probes in electronic communication with the actuating mechanism.

The features, functions, and advantages can be achieved independently in various embodiments of the present inventions or may be combined in yet other embodiments.

BRIEF DESCRIPTION OF THE DRAWINGS

FIG. 4 is a cross-sectional view of an embodiment of an insulation blanket according to the invention.

FIG. 5 a cross-sectional view of an embodiment of an insulation blanket according to the invention.

DETAILED DESCRIPTION OF THE PREFERRED EMBODIMENTS

The following detailed description should be read with reference to the drawings, in which like elements in different drawings are numbered identically. The drawings, which are not necessarily to scale, depict selected embodiments and are not intended to limit the scope of the invention.

For purposes of illustration, the below discussion will focus on the use of insulation blankets in aircraft but it should be understood by those skilled in the art that the various embodiments of insulation blankets according to the invention can be utilized in a variety of applications, including but not limited to homes, buildings and other structures, piping and duct work, aircraft, watercraft and the like.

As previously noted, insulation is typically installed to aircraft interior surface structures, subcomponents and subsystems in order to protect occupants, cargo, and equipment, and to piping and duct work that is part of environmental control systems and water and waste systems. Aircraft fuselages have what is often referred to as a skin which has an exterior skin surface and an interior skin surface and are of a generally circular cross-section, presenting an arcuate surface to which insulation blankets are applied. Additionally, insulation blankets are applied to horizontal and vertical surfaces in aircraft. The interior skin surface of an aircraft fuselage typically bears a series of support structures referred to herein as struts or bulkheads that support the fuselage and partition the interior skin surface. Insulating blankets are applied to the interior skin surface between these struts or bulkheads and may also span or cover the struts themselves when installed.

Figure 6:
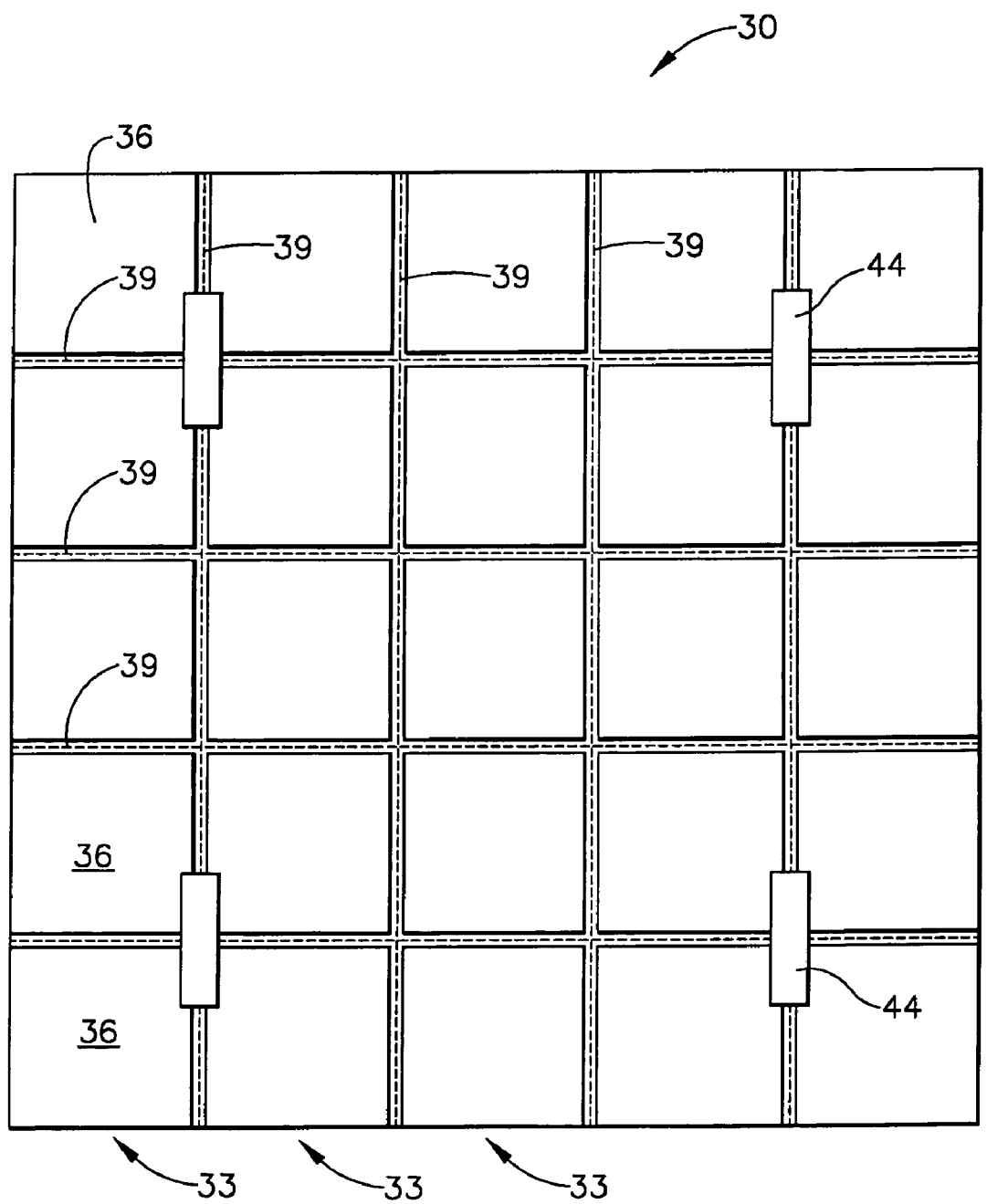
FIG. 6 is a plan view of an embodiment of an insulation blanket according to the invention installed to the surface of a structure

Referring to FIG. 4, an embodiment of an insulating blanket 30 according to the invention is depicted in cross-sectional view. Blanket 30 has a plurality of batting blocks 32 a cover 34, and a plurality of modules 33 within in which batting blocks 32 are contained. Cover 34 has sealed perimeter edges 35 and is formed of two layers, a distal layer 36 and a proximal layer 38 which are in mated, sealed relationship along the sealed perimeter edges 35 and along heat-sealed seams 39 that span the blanket longitudinally and/or latitudinally as shown in FIG. 6. Returning to FIG. 4, batting blocks 32 are disposed between layers 36, 38 within and spaced apart, being separated by heat-sealed seams 39. Heat-sealed seams 39 and sealed perimeter edges 35 delineate plurality of modules 33 within which batting blocks 32 are contained.

Batting blocks 32 may be formed of insulating materials known to or utilized by those skilled in the art, including but not limited to non-woven and woven materials, fiberglass, mineral wool or refractory ceramic fibers. Batting blocks 32 may be formed of one or more layers of insulating material. When formed of more than one layer of insulating materials, the multi-layers may be mechanically held together, for example, by stitching, tufting, or heating to melt-bond the multi-layers together. The multi-layers may also be held together by adhesives or tackifiers. It is understood by those skilled in the art that selection of type of insulation (e.g., fiberglass or mineral wool and woven or non-woven, single or multi-layer) is a matter of engineer and design choice, cost, environmental health considerations and insulation application, i.e., thermal and/or acoustical insulation, aircraft, commercial or residential building insulation, and the like.

For typical aircraft applications, batting blocks 32 may be formed of non-woven insulating materials such as fiberglass, duct wrap insulation, or other insulation materials known to those skilled in the art. Non-limiting examples of commercially available insulation materials include Nomex® insulation manufactured by the DuPont Company; Mircolite™ insulation manufactured by Johns-Manville of Defiance, Ohio; and Ultracore® aircraft insulation, manufactured by UPF Corporation of Bakersfield, Calif. to name a few.

Cover 34 and its layers 36, 38 may be formed with any of a variety of materials, and are preferably formed of moisture-penetration resistant materials. Thermoplastic film sheets and film laminates are well-suited for this use and may be formed of a variety polymeric material, including without limitation synthetic polymers, copolymers, coextruded polymers, and film laminates such as polyvinyl fluoride, polyimide, polyamide, polyamide-imide, polyester, polybutadiene, polyetherimide, polysulfone, polybutylene therephthalate amid polyetheride, polyvinyl chloride, polyurethane, and more preferred polypropylene, and even more preferred polyethylene terephthalate. Such even more preferred cover material is also know as PET or polyester film and is available from a number of manufacturers and distributors.

To allow gases and moisture to pass in and out of blanket 30, it may be provided with breathers such as prior art breather 20 or other breather systems known to those skilled in the art. Blanket 30 may include a plurality of punctures is either or both of layers 36, 38 to all blanket 30 to breath. Preferably, the plurality of punctures are applied to distal layer 36. The plurality of punctures may be applied in layers 36, 38 before blanket 30 is assembled or post-assembly.

There is tremendous variety in aircraft model design with a large number of insulations applications. Prior art insulation blankets would be stockpiled in large number of standard sizes which often would have to be manually reworked, present the aforementioned problems of the prior art. Embodiments of blanket 30 according to the invention may also be provided in standardized sizes but "re-working" is far less labor intensive and "re-worked" blankets 30 do not present the problems of the prior art due to the modularized design. As discussed later herein below, blankets 30 can be torn or cut along perforation in heat-sealed seams 39 without exposing the batting or necessity for resealing of cover edges because the integrity of modules 33 is maintained.

Blankets 30, or modules 33 thereof, may be provide in a number of standardized sizes suitable for universal application in a variety of aircraft models and designs. Though less practical, blankets 30, of course, can be provided in any desired size from small to large and in sizes for unique applications. Blankets 30 may be sized and configured to generally conform to the dimensions of the insulation area, the area of the surface of the structural component, space or object to be insulated. However, the overall dimensions of insulation areas may be longer and/or wider than blankets 30 in stock. For example, in aircraft applications, the width of blanket 30 may be sized so that a single blanket fits between the struts 62 of the fuselage 60. As the struts 62 span the interior circumference of the generally circular fuselage, the insulation area may be of an overall length requiring a impractically long blanket. For some applications, the distance between struts 62 may be wider than the width of a single blanket 30 in stock. In the case of an oversized insulation area relative to blankets 30 in stock, more than one blanket 30 may be utilized. For insulation areas that are smaller than the dimensions of the blankets 30 on hand, the blankets may be "re-worked," manually sized by tearing or cutting along perforations in heat-sealed seams 39 to provide an insulation of required size, without exposing batting blocks 32 or need for resealing cover 34. Conceivably, for some insulation areas, blanket 30 may be manually sized to a single row or column of modules 33.

Figure 9:
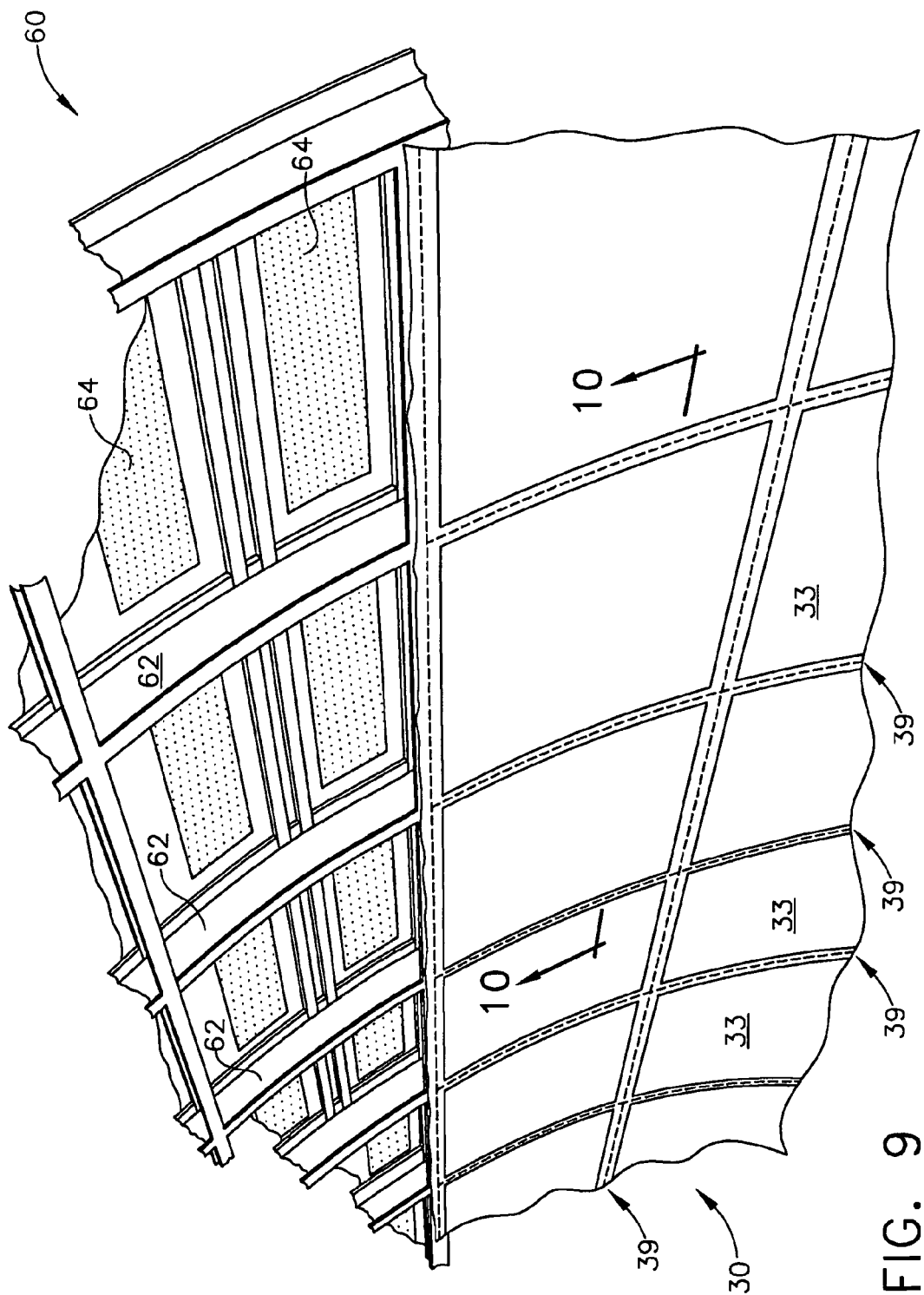
FIG. 9 is a fragmentary, perspective view of the interior of an aircraft fuselage with an embodiment of an insulation blanket according to the invention installed to a portion of the interior skin surface.

Blanket 30 shown in plan view in FIG. 6, can be seen to have a series or lattice of longitudinal and latitudinal heat-sealed seams 39, appearing as a grid on a surface of blanket 30. This grid or network delineates modules 33. As shown in FIG. 9, heat-sealed seams 39 my have a width that generally corresponds to the width of the struts 62 for aircraft applications. For some insulation applications, this allows blankets 30 to be applied to the interior skin surface of an aircraft fuselage 60 with seam 39 covering the strut 62 and the strut 62 sandwiched between adjacent rows of modules 33. Struts 62 extend a distance from the interior skin surface. While blanket 30 may have a thickness or height that is less than, equal to or greater than this distance, preferably, the height of modules 33 battings 32 therein is at least generally equal to the distance that struts 62 extend from the interior skin surface of the aircraft applications. It should be understood that the width of heat-sealed seams 39 will vary for different aircraft designs and for different non-aircraft applications.

Heat-sealed seams 39 and sealed perimeter edges 35 are portions of the cover layers 36, 38 that are in mated, sealed relationship having been sealed together with thermal heat or ultrasonic welding. Heat is applied under pressure at a temperature and for a time sufficient to soften and bond the thermoplastic films sheets of layers 36, 38. Heating is carried out so that the thermoplastic material stiffens upon cooling but not to the point of brittleness. Heat-sealed seams 39 may be perforated to provide a tear-line to allow for on-site, manual sizing by tearing or cutting along the perforations. Heat-sealed seams 39 may also be provided with compressible folds, which may be provided with or without perforations.

Figure 11:
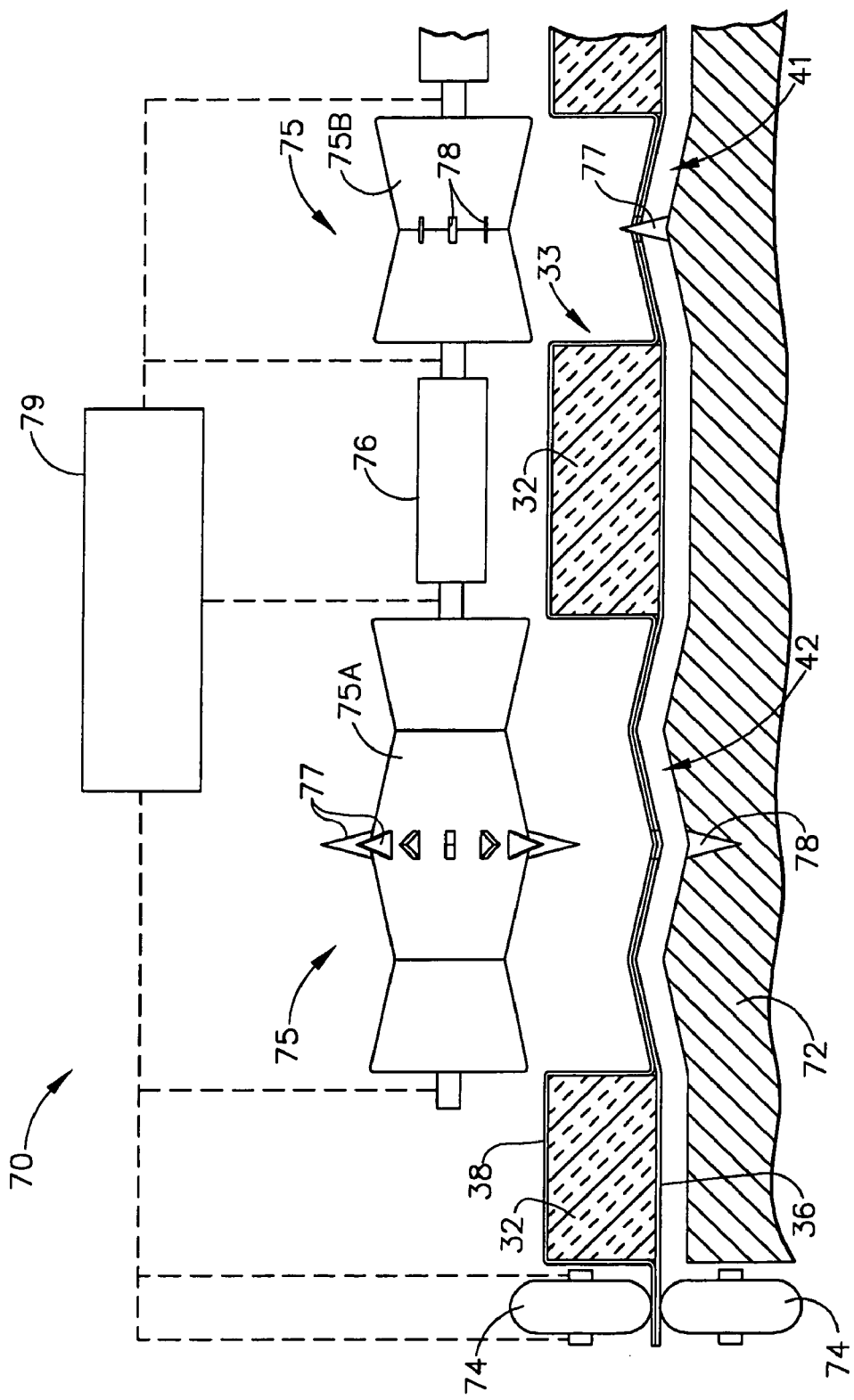
FIG. 11 is a partial, side view of an embodiment of an apparatus according to the invention with an embodiment of an insulation blanket according to the invention shown in cross-section.

The compressible folds are formed by creasing of heat-sealed seams 39. For example, a crease is applied approximately at each juncture of heat-sealed seam 39 and the bordering adjacent modules 33 and another generally central crease will result in a single compressible or V-shaped fold 41. Folds 41 are depicted in FIG. 11–14. Another example of a compressible fold is shown in FIGS. 5, 11, and 14. This fold may be viewed in cross section as being an M-shaped fold 42. An M-shaped fold 42 is formed substantially like the single fold example, except that instead of a single central crease, there are 3 generally equally spaced creases. Thus, compressible folds may be understood to result from an overall odd number of creases applied along the length of heat-sealed seam 39. A sealed perimeter edge 35 may also be provided with a crease running the length of the edge 35 along a line generally delineated by the juncture of edge 35 and the abutting module 33 or modules 33. This crease makes sealed perimeter edge 35 foldable.

The sections of a compressible fold or foldable sealed perimeter edge 35 when folded may have a height that is less than, equal to or greater than the height of the abutting modules 33. However, the height of the folded sections are preferably uniformly equal to that of modules 33. Perforations may be formed along the creases or the creases may themselves be formed by the perforated. In either case, the perforations may facilitate folding of heat-sealed seams.

When blanket 30 is installed, the folds, whether along sealed perimeter edge 35, between adjacent modules 33, or the foldable section remaining after separation along a tear-line, may provide lateral support and stability to blankets installed between struts, the folds having some limited spring like attributes. Further, compressed folds may act as a stop against compression of blanket 30 against a structural component during installation. Compression of blanket 30 or of batting blocks 32 can result in diminished or loss of insulation properties.

Modules 33 have dimensions defining an interior volumes and the batting blocks 32 are sized to substantially conform to the dimensions of the interior volume of modules 33 in which they are disposed. Batting blocks 32 may be mechanically or adhesively secured to the interior surface of at least one of cover layers 36, 38 of module 33 within which they are disposed. Any suitable fastener known to those skilled in the art may be used to mechanically secure batting blocks 32 to and interior surface of module 33, such as a hook-lock, by way of non—limiting example. Similarly, adhesives and tackifiers suitable for adhesively securing batting blocks 32 to cover layers 36, 38 may be used and are readily identified by those skilled in the art.

Blanket 30 may be installed and retained on a structural surface of a aircraft fuselage, pipe, wall or other structure with a variety of retention systems, including conventional retention systems adapted for use with blanket 30. Although blanket 30 may otherwise be installed using conventional methods, those methods are known to result in pocketing and pooling. In order to avoid pocketing and pooling, blanket 30 is preferably installed with a constant interface between the surface of the insulation area and the surface of blanket 30 that abuts it. This allows blanket 30 to conform to the contours of the structure surface to which it is applied. Such systems include, without limitation, tape, pressure sensitive tape, hook and loop systems, peel and stick tape systems, combined hook and loop with peel and stick tape systems, self-adhering retention systems, mated mechanical attachment systems, combinations thereof, and the like. Attaching fastener systems may be used, but some require penetration through blanket 30 which may create a sizable hole which must be sealed. Further penetration with components of attaching fastener systems may undesirably compress battings 32. Adhesive retention systems may require labor intensive surface preparation and also may require curing and associated delay for curing time. Nonetheless, these and other prior art retention systems may be utilized to install blanket 30.

FIG. 6 is a plan view of an embodiment of the insulation system of the invention showing blanket 30 attached to an aircraft structure in plan view. In FIG. 6, blanket 30 is shown installed and secured to aircraft structure with mechanical fasteners 44. The mechanical fasteners 44 are secured to aircraft structure through heat-sealed seams 39. When installing prior art blanket 10, mechanical fasteners 44 would penetrate directly through sheets 16 of cover 14 and through the batting 12. As previously mentioned, this could result in a sizable hole that would require sealing in order to protect the integrity of prior art blanket 10 and prevent significant moisture intrusion into prior art blanket 10 and its batting 12. With blanket 30 of the invention, mechanical fasteners are inserted through heat-sealed seams 39 thus avoiding direct penetration through modules 33 and any diminishment of the integrity of modules 33.

Figure 1:
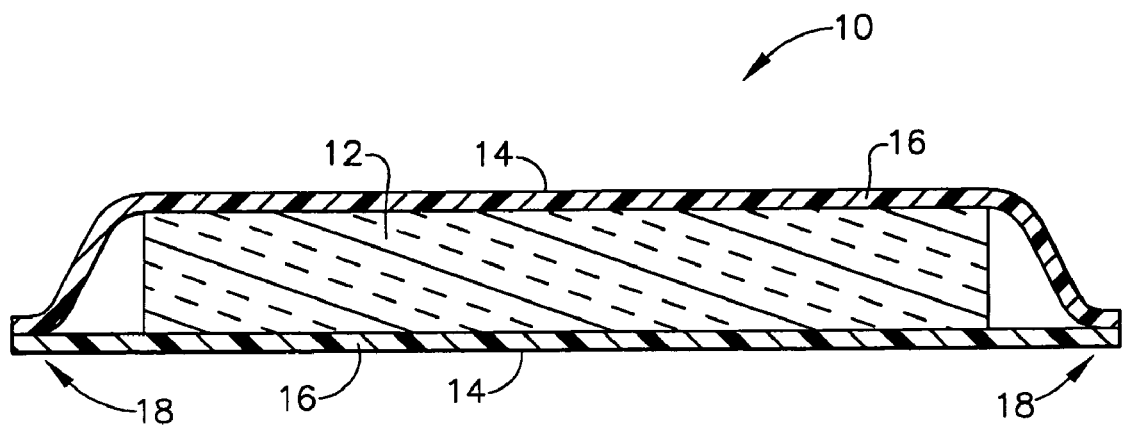
FIG. 1 is a cross-sectional view of a prior art insulation blanket.
Figure 2:
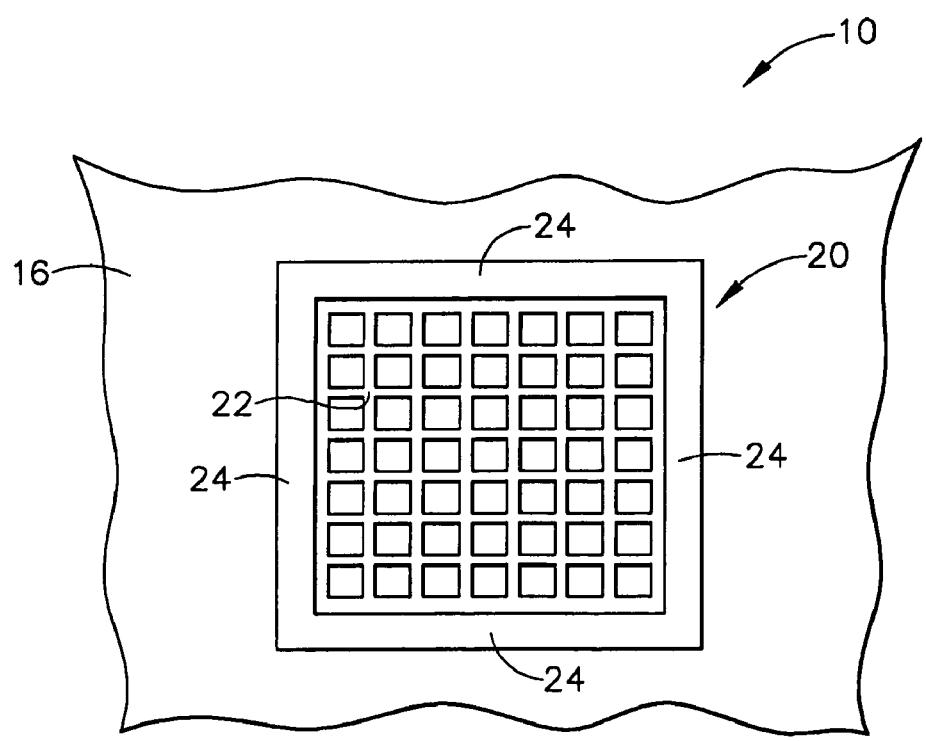
FIG. 2 is a fragmentary, plan view of a prior art insulation blanket with a breather.
Figure 3:
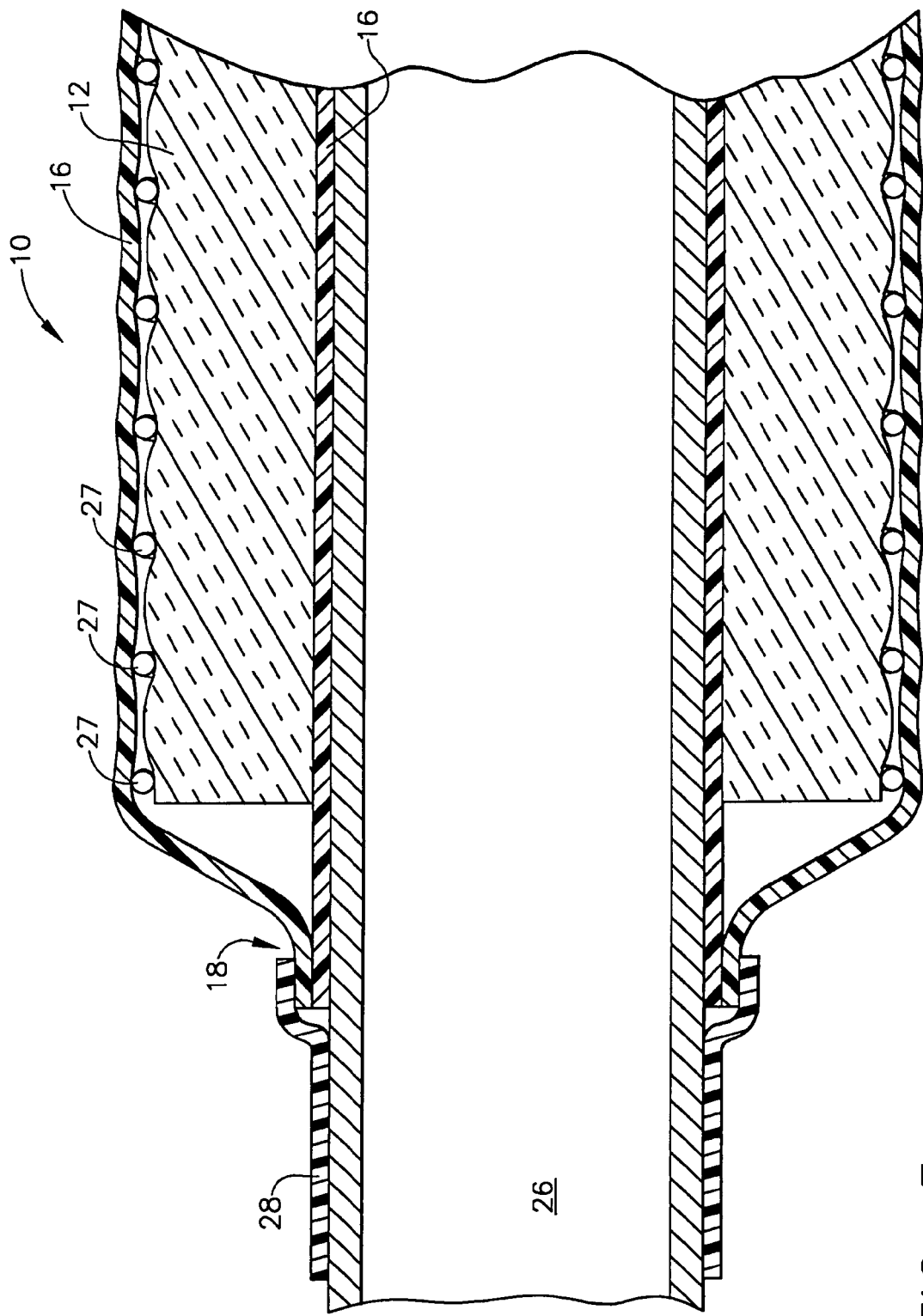
FIG. 3 is a partial, cross-sectional view of a prior art insulation blanket installed around a section of pipe.
Figure 7:
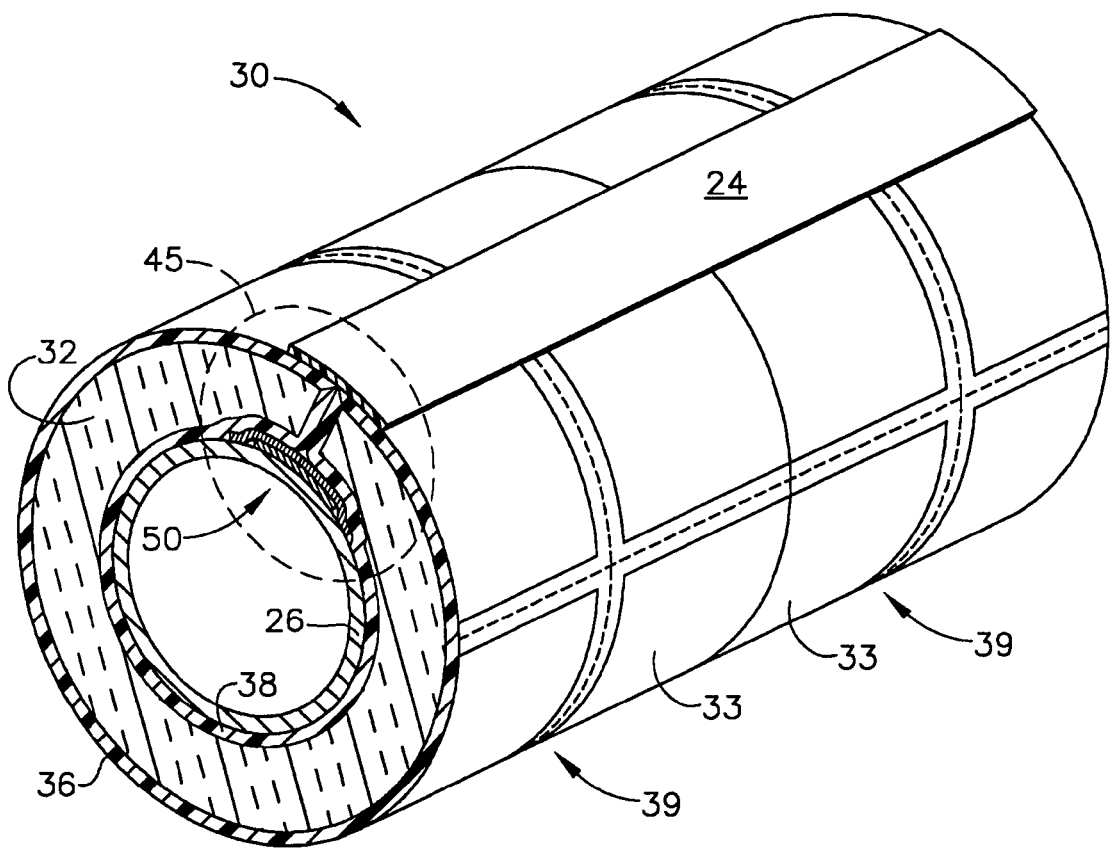
FIG. 7 is a partial, cross-sectional, perspective view of an embodiment of an insulation blanket according to the invention installed around a section of pipe.
Figure 8:
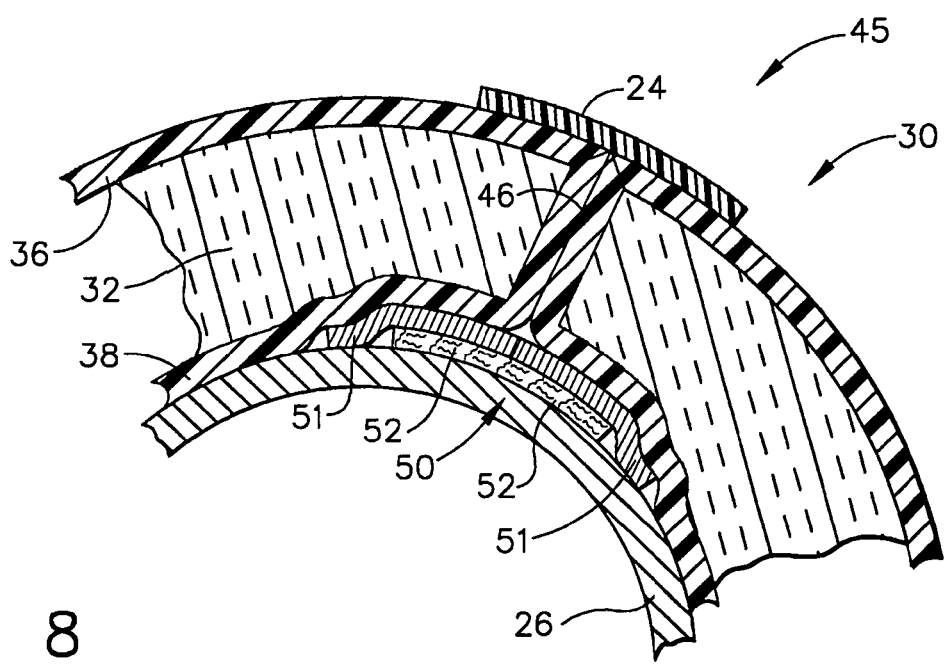
FIG. 8 is an expanded view of detail 45 of FIG. 7.

FIGS. 7 and 8 depict an embodiment of the insulation system of the invention with blanket 30 wrapped around a section of pipe or duct 26. In FIG. 7, this insulation application is shown in cross-sectional, perspective view with encircled detail 45. FIG. 8 shows encircled detail 45 in expanded view. Referring to FIG. 7, pipe 26 is insulated by blanket 30 with proximal layer 38 in constant interface with the exterior surface of pipe 26. Opposed ends of blanket 30 abut to form a joint 46 delineated by a line extending between distal layer 36 and proximal layer 38. Joint 46 is sealed along its length with tape 47 applied to distal layer 36. Two blankets 30 have been applied and can be seen to abut one another without the bear space that is present when prior art blanket 10 is installed as shown in FIG. 3. In the insulation application shown in FIGS. 7 and 8, blanket 30 is secured to pipe 26 with a hook and loop retention system 50 attached to parallel or opposed, sealed perimeter edges 35 on proximal layer 38. Here, the two blankets 30 are sized to fit around pipe 26 with parallel perimeter edges 35 being in abutting contact without a bear space therebetween when installed.

Turning to FIG. 8 detail 45 is shown and hook and loop retention system 50 can be seen to include hook elements 51 and loop elements 52. Hook elements 51 are attached to perimeter edges 35 and loop elements 52 are attached to the exterior surface of pipe 26. Of course, the positions of hook elements 51 and loop elements 52 could be reversed. Hook and loop retention systems, such as Velcro® brand for example, are commercially available and may be purchased as a peel-and-stick tape products, allowing for ready attachment to both blanket 30 and to an insulation area such as the exterior surface of pipe 26 or of aircraft fuselage 60. Although the embodiment of FIG. 7 is shown with a hook and loop retention system, it should be understood that other retention systems may be used for pipe installations as well as other installations. Such other retention systems may also be provided with mated member pairs that engage one another, either in releasable or non-releasable engagement.

Preferably, the hook and loop retention system shown in FIGS. 7 and 8 is comprised of mated hook and loop elements; and more preferably, it further comprises a peel and stick tape. The tape being an integral part of the hook and loop retention system. In the more preferable hook and loop retention system, one member may be adhered to perimeter edges 35 on one side, mated to the other member on the other side. The other member bears the peel and stick tape which is peeled prior to installation and adheres to the pipe or other insulation are when applied. Once installed the juncture where perimeter edges 35 abut may further be protected and sealed with tape 24 along the length of the juncture as shown in FIG. 7.

Blanket 30 may be provided with a retention system, such as hook and loop retention system 50, affixed thereto or a retention system may be affixed by worker at the time of installation. In the latter case, retention systems, such as hook and loop retention system 50 or other peel and stick tape retention system, may be provided with the two members in mated relationship and sandwiched between two separate lengths of peel and stick tape. In order to further facilitate and maintain a constant interface between blanket 30 and the surface of an insulation area, a peel and stick tape retention system, hook-and-loop retention system 50, other retention system, or combinations thereof may be applied at different locations on the surface of the blanket that will be contacting the insulation area. For typical insulation applications, this would be exterior surface of proximal layer 38 of modules 33.

Referring to FIG. 9, a fragmentary, perspective view of the insulation area of an aircraft fuselage is illustrated with an embodiment of an insulation blanket according to the invention installed to a portion of the interior skin surface. Uncovered or exposed section of the insulation area of aircraft fuselage 60 are shown between struts 62. In this uncovered section, the insulation area or interior skin surface can be seen to bear noise dampers 64 which are conventionally applied to the interior skin of an aircraft fuselage. Noise dampers 64 are metallized tiles which function to reduce wind, engine, and other mechanical noise in aircraft. Given the number of dampers 64 that may be required, their installation is labor intensive and costly. Installation requires multiple steps, including surface preparation, determination of proper location and spacing, and application of adhesives to name a few. Labor, time and cost can be reduced by providing blankets 30 with noise dampers 64 affixed to the surface of blankets 30 that will be in constant interface with the structural surface.

Figure 10:
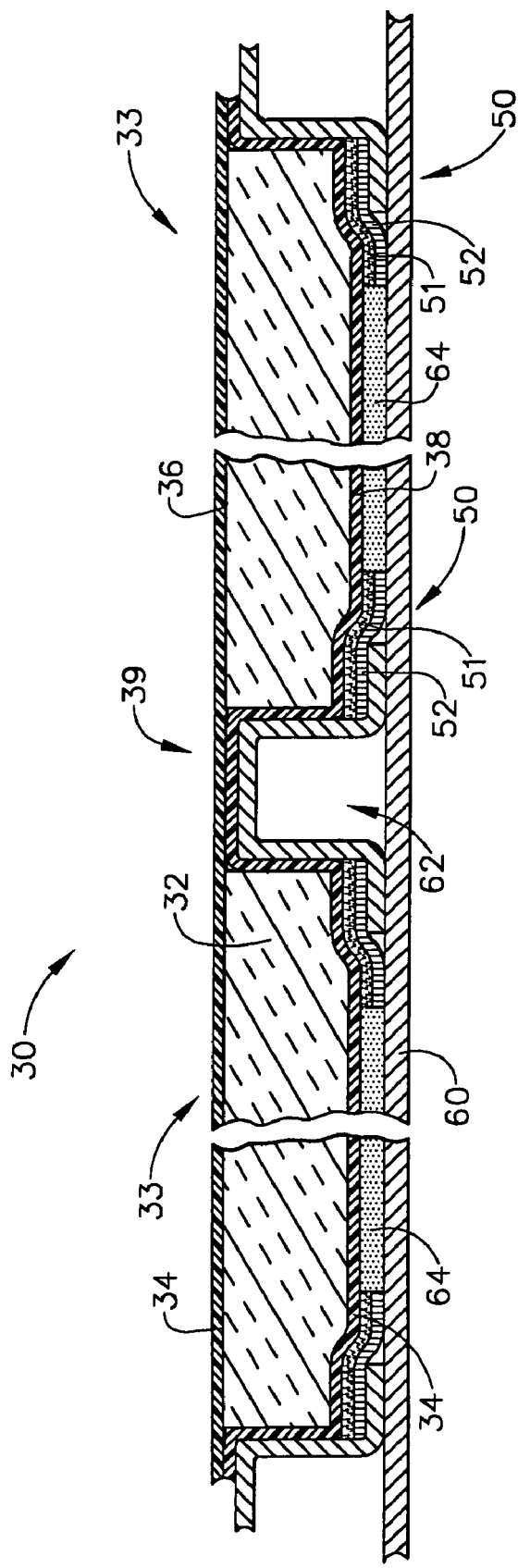
FIG. 10 is a fragmentary, cross-sectional view of an embodiment of an insulation blanket according to the invention installed to a portion of the interior skin surface of an aircraft fuselage viewed along line 10—10 of FIG. 9.

In FIG. 9 a portion of the interior skin surface is covered with an embodiment of blanket 30. Although blanket 30 may be provided without dampers 64, FIG. 10 shows an embodiment of blanket 30 with noise dampers 64 included as a part of blanket 30. FIG. 10 is a cross-sectional view of the aircraft fuselage 60 as shown in FIG. 9 along section $10^{-10}$. In FIG. 10, blanket 30 installed between struts 62. A section of blanket 30 is shown spanning strut 62 which is covered by heat-sealed seam 39 and sandwiched between adjacent modules 33. Blanket 30 is secured with hook-and-loop retention system 50 to the interior skin surface of fuselage 60. Hook members 51 of hook-and-loop retention system 50 is attached to proximal layer 38 of cover 34. Noise dampers 64 are also shown affixed or adhered proximal layer 38 and as integral parts of blanket 30. Blanket 30 is secured in constant interface with the interior skin surface of fuselage 60 by engagement between hook members 51 and loop members 52 which are affixed to the interior skin surface. Noise dampers 64 are shown bordered by hook and loop retention systems 50. Proximal layer 38 may be provide with noise dampers already affixed in predetermined positions, preferably locations corresponding to a generally central location of modules 33 to be formed thereunder or they may be affixed post-assembly at any time prior to blanket installation.

The thickness of damper 64 and the overall thickness of hook-and-loop retention system 50, preferably, are approximately the same to aid in providing a constant interface. In an variation of this embodiment, noise dampers 64 could be affixed directly to hook members 51 and noise dampers 64 would be bordered by loop members 52. In this variation, the thickness of loop members 52, preferably, is approximately the same as the thickness of dampers 64, again to aid in providing a constant interface. Though preferably approximately the same, blanket 30 may made, within certain tolerance, with differences in these thickness and can still be applied with relatively constant interface. Even without a interface of continuous contact, good insulating properties can be realized with tolerance for minimal spacing between blanket 30 and the structural surface as long as blanket 30 generally conforms to the shape of the surface. There is a greater tolerance for such spacing when blanket 30 is applied to a vertical surface and less tolerance when applied to horizontal or arcuate surfaces, due to the potential for and consequences of pooling.

With respect to the aforementioned retention systems and examples thereof, it should be understood that variations in the placement of retention system components or members on blanket 30 or on the structural surface to which blanket 30 is applied are contemplated and within the scope of the various embodiments of the invention. By way of non-limiting example, the hook member may be affixed to blanket 30 in predetermined positions and the loop member may be affixed in corresponding predetermined positions on the surface of the structure to be insulated. Alternatively, the entire system could be affixed or mounted to either blanket 30 or the structural surface. Also, combinations of retention systems may be utilized. For example, hook and loop retention system may be utilized along with mechanical fasteners 44 as shown in FIG. 6.

Applicants have developed apparatus 70 for assembly or manufacture of blanket 30. Referring to FIGS. 11 to 14, different embodiments of apparatus 70 are shown. Apparatus 70 is comprised of some, all or combinations of the following components: platen, sealers, heat-seal rollers, heat-sealing elements, creasing elements, perforating elements, combined creasing/heat-sealing device, combined heat-sealing/perforating device, combined creasing/heat-sealing/perforating device, upper heat-sealing element, lower heat-sealing element, ultrasonic welder and electronic controls.

Figure 12:
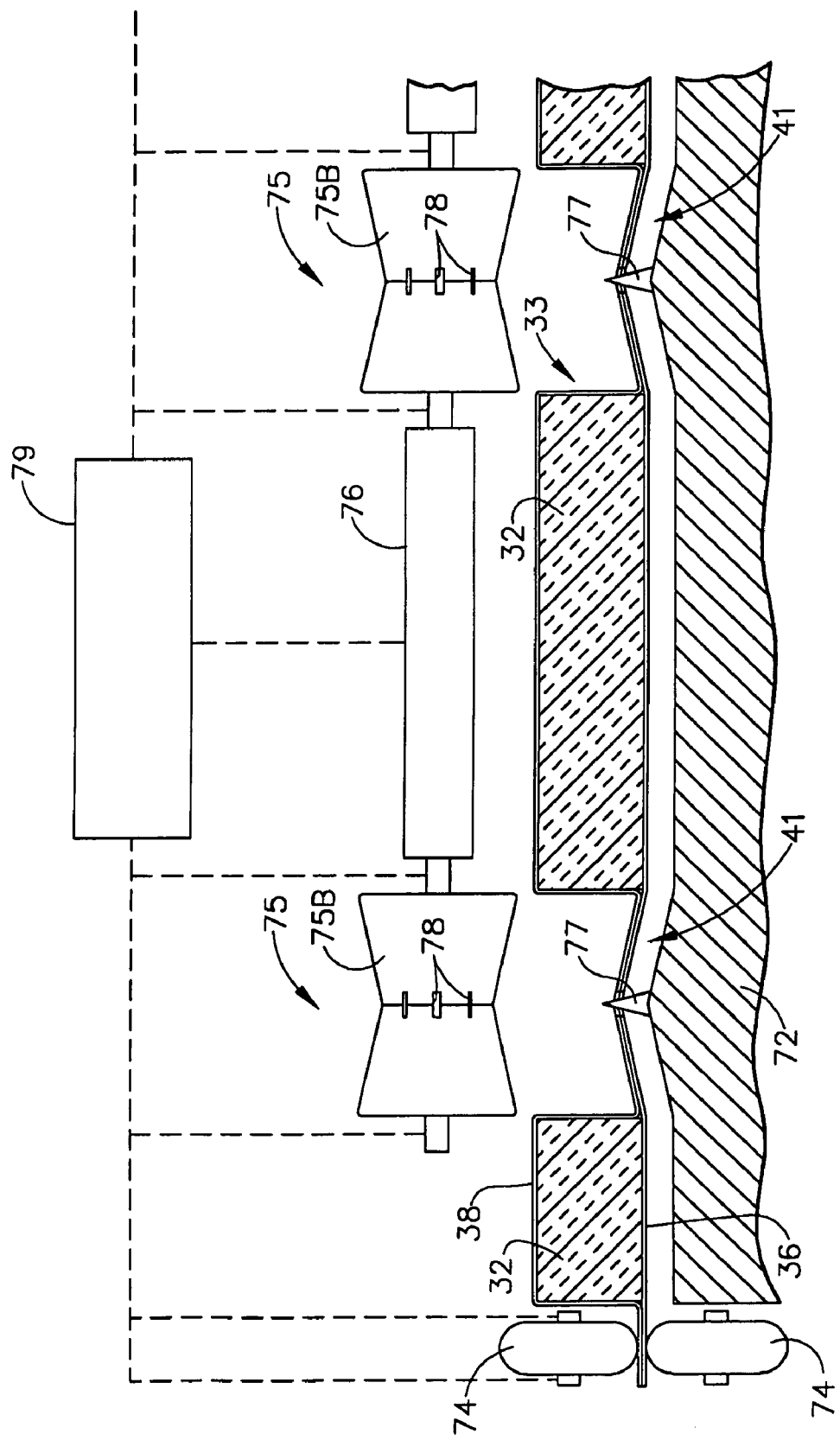
FIG. 12 is a partial, side view of an embodiment of an apparatus according to the invention with an embodiment of an insulation blanket according to the invention shown in cross-section.

Referring to FIGS. 11 and 12, an embodiment of apparatus 70 according to the invention is shown. The embodiments of apparatus 70 as shown in FIGS. 11 and 12 differ in the types of heat seal rollers 75 utilized therein. As can be readily understood from the figures and the discussion below different heat seal rollers allow for formation of different heat-sealed seams and compressible folds. Apparatus 70, has a platen 70 upon which the components of blanket 30, a blanket assembly, are supported during manufacture. A blanket assembly comprises distal layer 36, proximal layer 38, and batting blocks 32. Platen 72 is sized and configured to receive a blanket assembly or potion thereof and to accommodate the dimensions (length and width) of distal and or proximal layers 36, 38 of a blanket assembly or portion thereof and of batting blocks 32. Platen 72 may be provided with or without heating elements incorporated therein.

Apparatus 70 may further include edge sealers 74, shown in FIG. 11 as a mated pair. Alternatively, there may only be one edge sealer 74 positioned above the perimeter of platen 72. Edge sealers 74 are utilized to seal the perimeter edges of layers 36, 38 to provide sealed perimeter edges 35. Edge sealers 74 may be a heat-seal roller that generates heat through electrical resistance or a ultrasonic welding device that generates heat through ultrasonic energy or vibration. Sealed perimeter edges 35 may, less preferably, be formed by taping, stitching or other means known to those skilled in the art for forming a seal between overlapping layers or sheets. Apparatus 70 is configured so that edge sealers 74 can be moved around the perimeter of a blanket assembly, providing heat to the overlapping perimeters of distal and proximal layers 36, 38 in order to form sealed perimeter edges 35.

Apparatus 70 further includes a plurality of heat seal rollers 75 which may be oriented along a common axis. Further as shown in FIGS. 11 and 12, heat seal rollers 75 are sized to correspond to the width of heat-sealed seam 39. The plurality of heat seal rollers 75 may be unconnected or they may be joined by connective rollers 76, as shown in the embodiment of FIGS. 11 and 12. The plurality of heat sealer rollers 75 are spaced apart a predetermined distance corresponding to the width of modules 33. Connective rollers 76 may be adjustable to increase or decrease the spacing between heat seal rollers 75. This allows for manufacture of blankets 30 with different module dimensions on a single apparatus 70 without need for a separate apparatus 70 configured for production of individual blankets 30 of different sizes and dimensions.

As blanket 30 may have heat-sealed seams 39 that are additionally creased and/or perforated, apparatus 70 may be equipped with heat seal rollers 75 of different configurations. As shown in FIG. 11, apparatus 70 is equipped with heat seal rollers 75A and 75B. Heat seal roller 75A is configured to provide a perforated, foldable heat-sealed seam with five creases resulting in a M-shaped fold 42. The area of platen 72 immediately below heat seal roller 75 and heat seal rollers 75 are configured with sloped or angled surfaces forming peaks and conforming troughs that cooperate to form creases in heat-sealed seams 39. Creases are formed by cooperation between heat seal rollers 75B when pressure is applied to the area of overlap between distal and proximal layers 36, 38.

Similarly, a V-shaped fold 42 may be formed with heat seal roller 75B and the area of platen 72 immediately below heat seal roller 75B being configured with sloped or angled surfaces forming a peak and a conforming trough that cooperate to form creases in heat-sealed seams 39. As with heat seal roller 75A, creases are formed by cooperation between heat seal roller 75B when pressure is applied to the area of overlap between distal and proximal layers 36, 38.

Perforations may be formed by plurality of perforation elements 77 and corresponding plurality of recessed dentitions 78. Perforation elements 77 may be located on peaks of either heat seal rollers 75 or of platen 77 with dentitions 78 being positioned in the corresponding troughs of either dentitions 78 or heat seal rollers 75. As heat sealer roller 75 travels along the space between adjacent batting blocks 32, perforations are formed when pressure is applied to the area of overlap between distal and proximal layers 36, 38; and perforation elements 77 penetrate through heat-sealed seams 39 and are received within a plurality of recessed dentitions 78 to form a tear-line that may be torn or cut as needed. As shown in FIG. 11, heat seal rollers 75A is equipped with a plurality of perforation elements 77 and platen 72 provided with a plurality of recessed dentitions 78 that correspond to and receive perforation elements 77 as heat seal rollers 75A travels along the area of overlap between distal and proximal layers 36, 38. In FIGS. 11 and 12, heat seal rollers 75B are equipped with a plurality of dentitions 78 perforation elements 77 and the peak in the area of platen 72 immediately below heat seal roller 75B is provided with a plurality of perforation elements 77. Thus, it should be understood that heat seal rollers 75 may be provided in different configurations depending upon the design features to be incorporated into heat-sealed seams 39. This would include heat seal rollers 75 that do not include perforation and creasing elements or sloped or angled surfaces which might be utilized to provide non-foldable heat-sealed seams 39, seams heat that are not foldable or intended to be foldable such as for an application over struts 62 as shown in FIG. 10. As with edge sealers 74, heat seal rollers 75 may generate heat from electrical resistance or ultrasonic energy or vibration.

Whether separate or joined by connective rollers 76, the plurality of heat seal rollers 75 are operated in unison or synchronized motion so that longitudinal or latitudinal heat-sealed seams are provided in single pass of heat seal rollers 75. After a first pass of the sealers, the blanket assembly may be transferred or conveyed down the assembly line to a second apparatus 70 having a plurality of heat seal rollers 75 oriented to provide, if desired, heat-sealed seams 39 that are perpendicular to those provide in the first pass on a first apparatus 70. Alternatively, if the blanket assembly is of dimensions that can be accommodated in its entirety on platen 72, the blanket assembly or platen 72 may be rotated 90 degrees and a second pass of heat seal rollers 75 is then carried out to provide blanket assembly with intersecting longitudinal and latitudinal heat sealed seams 39. Blanket 30 may be provided with one or more heat-sealed seams 39, a plurality of heat sealed seams 39 in parallel or with intersecting longitudinal and latitudinal heat sealed seams 39.

The areas of platen 72 over which heat seal rollers 75 pass may be removable sections which allow for reconfiguration of apparatus 70. For example, such a section may be removed and the sections of platen 72 that abut the removable section may be moved together or the removable section my be replaced with a flat removable section or with a removable section of other configuration. Such reconfiguration would allow additional flexibility with respect to the number or variety of blanket designs that be formed on apparatus 70.

Figure 13:
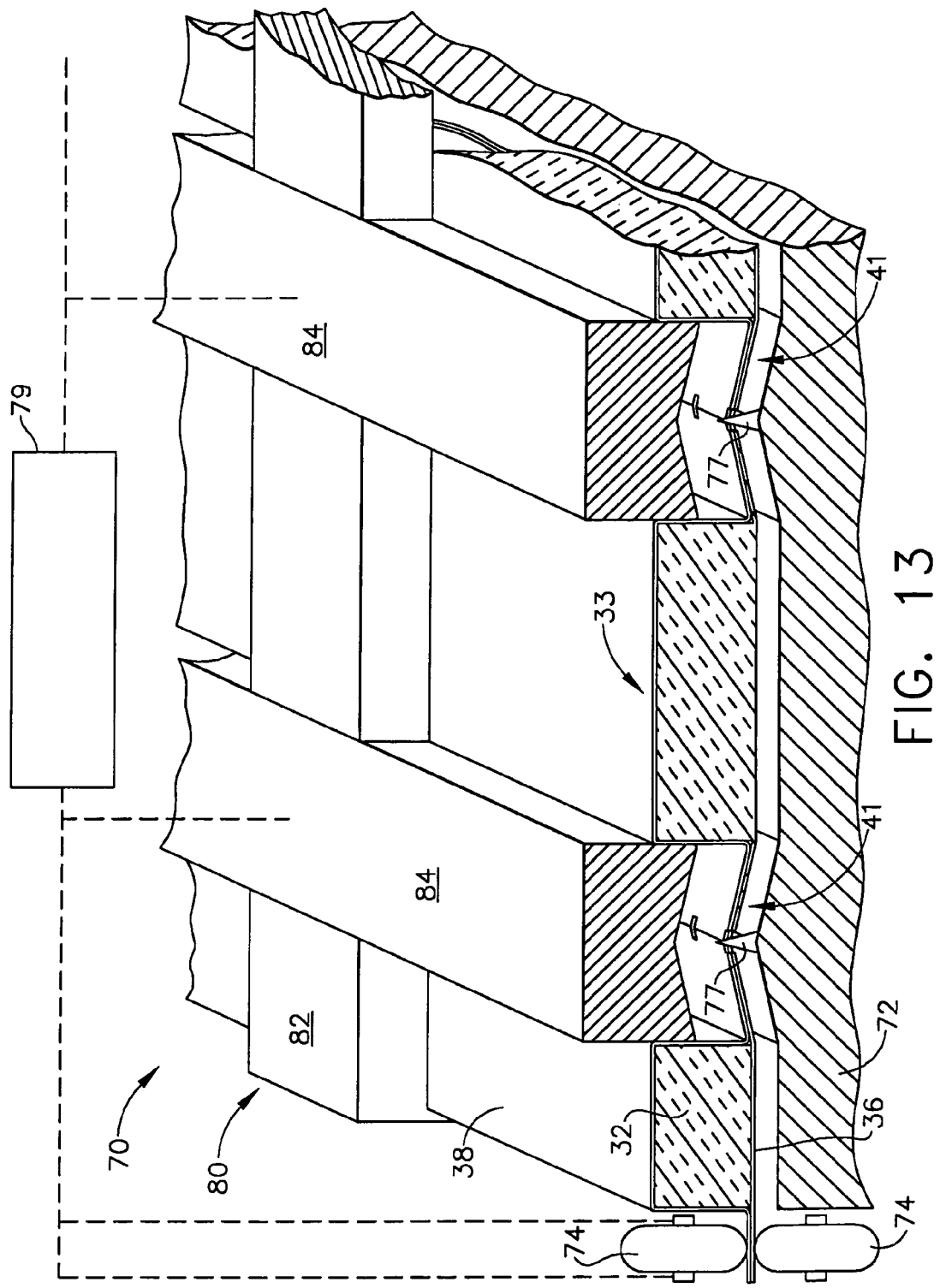
FIG. 13 is a partial, cross-sectional, perspective view of an embodiment of an apparatus according to the invention with an embodiment of an insulation blanket according to the invention.
Figure 14:
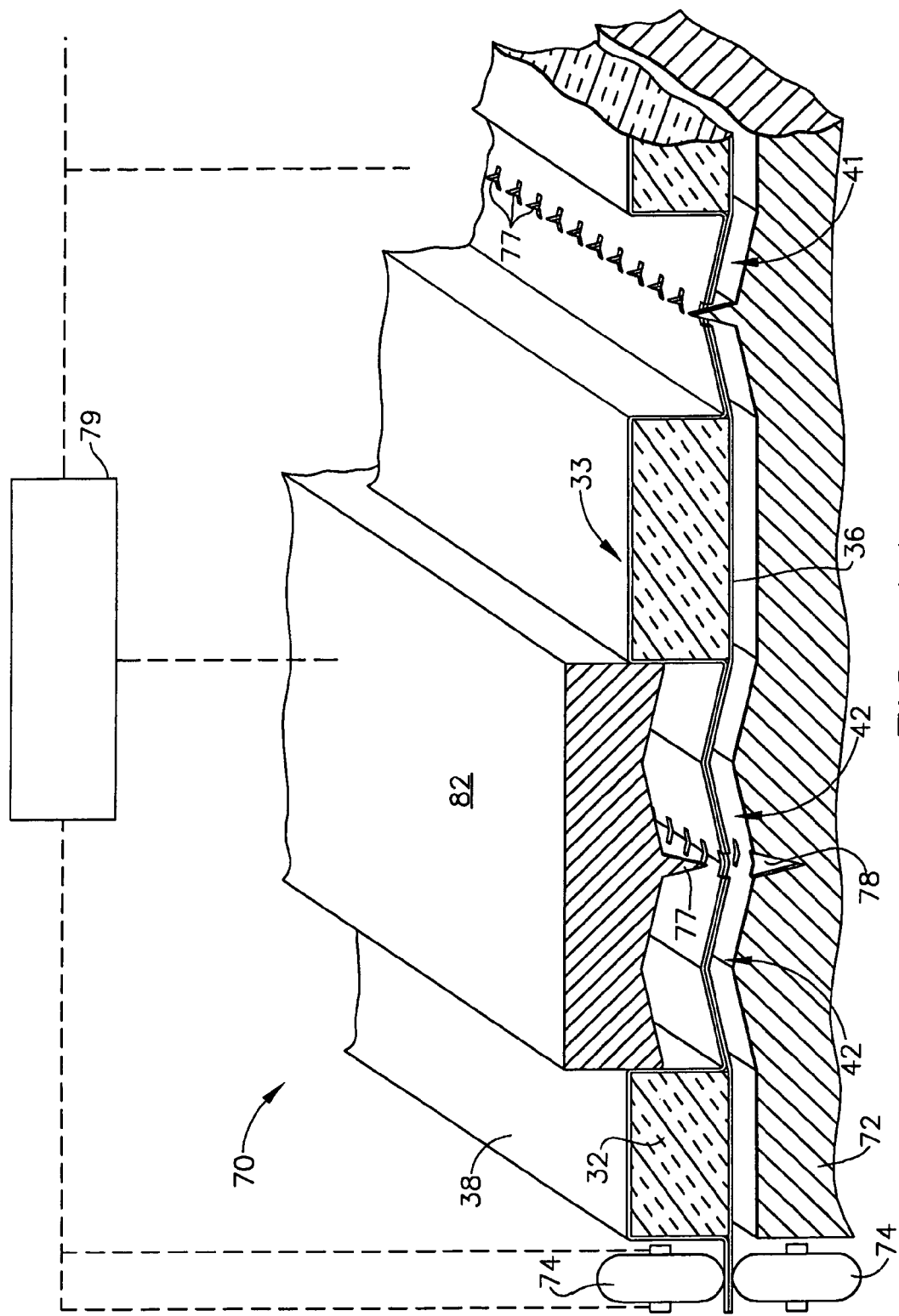
FIG. 14 is a partial, cross-sectional, perspective view of an embodiment of an apparatus according to the invention with an embodiment of an insulation blanket according to the invention.

Turning to FIGS. 13 and 14, variations of another embodiment of apparatus 70 are shown. As previously discussed embodiments, apparatus 70 includes platen 72 and edge sealers 74 and the discussion of these components are applicable here. The embodiment of FIGS. 13 and 14 differ from the embodiments of FIGS. 11 and 12 in that formation of heat-sealed seams 39 is carried out using heat seal mechanism 80 instead of heat seal rollers 75. Heat seal mechanism 80 is formed of a lattice of interconnected heat sealing elements 82, 84 which intersect and are oriented longitudinally and latitudinally. Preferably, interconnected heat sealing elements 82, 84, are perpendicular. Regardless of the specific orientation, interconnected heat sealing elements 82, 84 are spaced apart with the spaces there between define with module spaces having dimensions, width and length, corresponding to the dimensions of the modules to be formed in blanket 30. Interconnected heat sealing elements, 82, 84 have a width corresponding to the width of heat-sealed seams 39 to be formed in blanket 30. Heat sealing elements 84 are The configuration of heat seal mechanism 80 allows the grid of longitudinal and latitudinal heat-sealed seams 39 to be formed in a single step once a blanket assembly is positioned on platen 72. Heat seal mechanism 80 may be formed with heat seal elements 82, 84 in permanently fixed relationship. Although it is more costly, if desired the heat seal mechanism 80 may be optionally designed and configured so that heat seal elements 82, 84 are not in permanently fixed relationship and so that they may be adjusted to alter the spacing between a plurality of heat seal elements 82 or a plurality of heat seal elements 84. Adjustability allows for reconfiguration of the heat seal mechanism 80 facilitating manufacture of blankets 30 with modules 33 of different sizes on a single apparatus 70. When heat seal elements 82, 84 are in permanently fixed relationship, apparatus 70 generally can be utilized to only manufacture a blanket 30 of a single design with modules of predetermined dimensions.

As in apparatus 70 of FIGS. 11 and 12, apparatus 70 of the embodiment of FIGS. 13 and 14 creasing elements, perforating elements 77 and recessed dentitions 78 may be provided on heat sealing elements 82, 84 or on the portion of the platen 72 positioned immediately below heat sealing elements 82, 84. The heat seal elements may be configured to provide the desired type of heat sealed seam 39, whether perforated and/or foldable or not, and to provide the desired type of fold. As can be seen in FIG. 13 in cross-section, heat sealing element 84 is configured to provide V-shaped fold 41 as seen in FIG. 13. Although not shown in FIG. 13, heat sealing element 84 includes recessed dentitions 78 configured to receive perforation elements 77 incorporated in to platen 72. FIG. 14 shows in cross-section heat sealing element 82 which is configured to provide M-shaped fold 42. Heat sealing element 82 includes perforation elements 77 and platen 72 has recessed dentitions 78 below heating element 82. Note that platen 72 may instead have perforation elements as shown to the right of heating element 82. Heating elements 82, 84 may be configured differently depending upon the type of heat-sealed seam 39 desired and the configurations shown are merely provide by way of non-limiting example.

In each of the embodiments of apparatus 70 shown in FIGS. 11–14, edge sealers 74, heat seal rollers 75, rollers 76 and heat seal mechanism 80, and any heat elements incorporated into platen 72 and platen 72 may be operatively connected to an actuating mechanism 79 which may components including but not limited to drives or motors, temperature regulators, pressure regulators, and electronic controls for automated or semi-automated operation, connection to electric power sources, and combinations thereof. Additionally, a regulator of time or duration of pressure and heat application may also be included. Apparatus 70 in it various embodiments and configurations may further include probes or sensors for temperature and pressure which may be in electronic communication with actuating mechanism 79. Apparatus 70 and actuating mechanism 79 may be parts of a larger apparatus or system utilized to manufacture blankets 30.

Methods for forming blanket 30 have generally be disclosed in the above discussion, but are more specifically addressed in the following discussion. Blanket 30 may be formed by providing a blanket assembly comprised of distal layer 36 and proximal layer 38. Batting blocks 32 are positions in predetermined spaced relationship between layers, 36, 38. The distance between batting blocks 32 should generally corresponding to the width of heat-sealed seams 39 to be formed between them. This may be accomplished by first placing batting blocks 32 on distal layer 36 and then draping proximal layer 38 over batting blocks 32 and distal layer 36 or covering batting blocks 32 and distal layer 36 with proximal layer 38. If hook-locks or other mechanism or adhesive to be used to secure batting blocks 32 to distal layer 36 or proximal layer 38, they would be applied prior heat sealing.

In order to allow for the height and number of batting blocks 32, the overall dimensions of proximal layer 38 should be larger than that of distal layer 36. The perimeter of proximal layer 38 should overlap the perimeter of distal layer 36. If the perimeter of proximal layer 38 extends substantially beyond that of distal layer 36, proximal layer may be trimmed back along its perimeter prior heat sealing to form sealed perimeter edge 35. Alternatively, it may be trimmed back after sealed perimeter edge 35 is formed. Apparatus 70 may additionally include a cutting or trimming element for this purpose or trimming can be performed after blanket 30 is assembled in post-assembling finishing. Preferably, proximal layer 38 is sized provide sufficient sheeting material to form modules surrounding and encapsulating batting blocks 32 on all sides in conjunction with distal layer 36 without need for trimming.

Blanket assembly steps may be carried out on platen 72 or blanket assembly may be placed on or fed into apparatus 70. Once in place, the portions of distal and proximal layers 36, 38 where heat-sealed seams 39 will be formed should be positioned or aligned over the portion of platen 72 that is also aligned in heat-sealing engagement with heat seal rollers 75 or with heat sealing elements 82, 84. With the blanket assembly in proper position, Heat seal rollers 75 or heat seal mechanism 80 are actuated bring them in to heat-sealing engagement with platen 72 and heat and pressure are applied for a time sufficient to bond distal and proximal layers 36, 38 together into heat-sealed seams 39. Depending upon the configuration of heat seal rollers 75 and heat sealing elements 82, 84, 86 and whether they or platen 72 include perforations elements 77 and recessed dentitions, blanket 30 will heat-sealed seams 39 which may be creased and/or perforated, or not.

While exemplary embodiments of this invention and methods of practicing the same have been illustrated and described, it should be understood that various changes, adaptations, and modifications might be made therein without departing from the spirit of the invention and the scope of the appended claims.

What is claimed is:

1. An insulated aircraft component, comprising:
   at least one surface,
   at least one strut partitioning the surface; and
   a modular insulation blanket system comprising a modular insulation blanket, the insulation blanket being comprised of a plurality of batting blocks and a cover having sealed perimeter edges, a distal layer and a proximal layer; the layers being mated in a sealed relationship along a lattice of longitudinal and latitudinal heat sealed seams, the seams forming a plurality of modules between the layers, the batting blocks being disposed between said layers within the modules which are separated by heat-sealed seams, and the insulation blanket being affixed to the surface of the aircraft component such that at least one of the heat-sealed seams spans across the at least one strut and the strut is sandwiched between adjacent modules.

2. The insulated aircraft component of claim 1, wherein the insulation blanket is affixed to the surface of the component with a retention system selected from a group consisting of mated mechanical attachment systems, peel-and-stick tape retention systems, hook-and-loop retention systems, tape, combined hook-and-loop and peel-and-stick tape retention systems, self adhering retention systems, adhesives, a plurality of mechanical fasteners, and combinations thereof.

3. The insulated aircraft component of claim 1, wherein each layer has an interior cover surface and an exterior cover surface and each of the plurality of batting blocks are attached to at least one interior cover surface of the module in which said batting block is disposed.

4. The insulated aircraft component of claim 1, wherein at least one of the heat-sealed seams is perforated to provide a tear-line.

5. The insulated aircraft component of claim 1, wherein at least one of the heat-sealed seams is a foldable seam.

6. The insulated aircraft component of claim 1, wherein at least one of the heat-sealed seams is perforated to provide a tear-line and at least one of the heat-sealed seams is a foldable seam.

7. The insulated aircraft component of claim 1, wherein the distal cover layer of the plurality of modules is perforated to allow the modules to breath.

8. The insulated aircraft component of claim 1, wherein the blanket further comprises further comprising a breather in the distal cover layer of each of the plurality of modules.

9. The insulated aircraft component of claim 1, wherein the cover has at least four sealed perimeter edges, the blanket further comprising an attachment means affixed to at least one of the sealed perimeter edges, said attachment means being selected from a group consisting of a mated mechanical attachment system, a peel-and-stick tape systems, a hook-loop retention system, tape, combined hook and loop and peel and stick tape retention systems, self-adhering retention systems, adhesives, a plurality of mechanical fasteners, and combinations thereof.

10. The insulated aircraft component of claim 1, wherein the cover has at least two opposed sealed perimeter edges, the blanket further comprising an attachment means affixed to each of the at least two opposed sealed perimeter edges.

11. The insulated aircraft component of claim 1, wherein the cover layers are formed of a thermoplastic film sheets.

12. The insulated aircraft component of claim 11, wherein the thermoplastic film sheets are selected from the group consisting of synthetic polymers, copolymers, coextruded polymers, combinations thereof and laminated thereof.

13. The insulated aircraft component of claim 1, wherein the cover layers are formed of a thermoplastic film sheet or film laminate selected from the group consisting of polyvinyl fluoride, polyimide, polyetheride, polyvinyl chloride, polyurethane, polypropylene, polyethylene terephthalate, and combinations thereof.

14. The insulated aircraft component of claim 1, wherein the insulating blanket is sized to conform with the demensions of the at least one surface.

15. The insulated aircraft component of claim 1, further comprising a plurality of noise dampers adhered to the proximal layer.

16. The insulated aircraft component of claim 1, further comprising a plurality of noise dampers and a hook and loop retention system both adhered to the proximal layer.

17. The insulated aircraft component of claim 1, wherein the insulation blanket is affixed in constant, conforming interface with the at least one surface.

18. The insulated aircraft component of claim 1, wherein another of the seams includes an inner crease formed approximately midway between a second pair of adjacent modules, and a pair of creases formed between the second pair of adjacent modules, a first crease of the pair formed on a first side of the inner crease and a second crease of the pair formed on a second side of the inner crease.

19. The insulated aircraft component of claim 1, wherein at least one of the sealed perimeter edges includes a crease formed along a juncture with an edge of module adjacent to the perimeter edge.

20. The insulated aircraft component of claim 19, wherein a height of the at least one sealed perimeter edge when folded along the crease is approximately equal to a height of the module adjacent the perimeter edge.

* * * * *